US012560948B2

(12) United States Patent
Reese et al.

(10) Patent No.: US 12,560,948 B2
(45) Date of Patent: Feb. 24, 2026

(54) ESCALATING HAZARD-RESPONSE OF DYNAMICALLY STABLE MOBILE ROBOT IN A COLLABORATIVE ENVIRONMENT AND RELATED TECHNOLOGY

(71) Applicant: Agility Robotics, Inc., Pittsburgh, PA (US)

(72) Inventors: Kevin Reese, Johannesburg, MI (US); Andrew Abate, Albany, OR (US); Tianyao Chen, Pittsburgh, PA (US); Jay Jasper, Albany, OR (US); Ezm Masoud, Kitchener (CA); Brian Kirby, Pittsburgh, PA (US); Melonee Wise, San Jose, CA (US); Prasanna Velagapudi, Pittsburgh, PA (US); Ryan Domres, Albany, OR (US); Todd Lewis, Pittsburgh, PA (US); Matteo Parigi Polverini, Portland, OR (US); Yves Georgy Daoud, Pittsburgh, PA (US)

(73) Assignee: Agility Robotics, Inc., Salem, OR (US)

( * ) Notice: Subject to any disclaimer, the term of this patent is extended or adjusted under 35 U.S.C. 154(b) by 0 days.

(21) Appl. No.: 19/067,681

(22) Filed: Feb. 28, 2025

(65) Prior Publication Data

US 2025/0278092 A1    Sep. 4, 2025

Related U.S. Application Data

(60) Provisional application No. 63/560,583, filed on Mar. 1, 2024.

(51) Int. Cl.
G05D 1/633 (2024.01)
G05D 1/49 (2024.01)
(Continued)

(52) U.S. Cl.
CPC ............. G05D 1/633 (2024.01); G05D 1/495 (2024.01); G05D 1/498 (2024.01); B62D 57/032 (2013.01);
(Continued)

(58) Field of Classification Search
CPC .............. G05D 1/633; G05D 2101/15; G05D 2109/12; G05D 1/495; G05D 1/498;
(Continued)

(56) References Cited

U.S. PATENT DOCUMENTS

| 5,369,346 A | 11/1994 | Takahashi et al. |
| 6,064,167 A | 5/2000 | Takenaka et al. |

(Continued)

FOREIGN PATENT DOCUMENTS

JP        2004025434 A    *    1/2004

OTHER PUBLICATIONS

Co-Pending U.S. Appl. No. 19/067,681, filed Feb. 28, 2025.
(Continued)

*Primary Examiner* — Nga X Nguyen

(57) ABSTRACT

A method in accordance with at least some embodiments of the present technology includes determining first hazard information about a human in an environment at a first time. The method further includes decelerating a mobile robot in the environment based at least partially on the first hazard information. The method further includes determining second hazard information about the human at a second time after the first time. The method further includes reconfiguring the mobile robot based at least partially on the second hazard information. Reconfiguring the mobile robot includes moving the mobile robot from a standing configuration to a non-standing configuration. The method further includes determining third hazard information about the human at a third time after the second time. Finally, the method includes
(Continued)

causing a safe operating stop of the mobile robot based at least partially on the third hazard information.

20 Claims, 11 Drawing Sheets

(51) Int. Cl.
| | |
|---|---|
| *G05D 1/495* | (2024.01) |
| *G05D 101/15* | (2024.01) |
| *G05D 109/12* | (2024.01) |
| *B62D 57/032* | (2006.01) |

(52) U.S. Cl.
CPC ..... *G05D 2101/15* (2024.01); *G05D 2109/12* (2024.01)

(58) Field of Classification Search
CPC ........... G05D 2105/28; G05D 2107/70; G05D 1/617; B62D 57/032; B25J 9/162; B25J 9/163; B25J 9/1676; G05B 2219/39082; G05B 2219/40202; G05B 2219/40264
See application file for complete search history.

(56) References Cited

U.S. PATENT DOCUMENTS

| | | | |
|---|---|---|---|
| 8,554,370 | B2 | 10/2013 | Goswami et al. |
| 8,880,221 | B2 | 11/2014 | Lee et al. |
| 9,429,948 | B2 | 8/2016 | Gouaillier |
| 10,821,606 | B2 | 11/2020 | Xiong |
| 10,898,999 | B1 | 1/2021 | Cohen |
| 11,981,517 | B2 | 5/2024 | Sun et al. |
| 11,994,874 | B1 | 5/2024 | Paschall et al. |
| 2014/0067121 | A1* | 3/2014 | Brooks .................. B25J 9/1676 |
| | | | 700/255 |
| 2017/0088205 | A1* | 3/2017 | Karras ................... B64U 20/30 |
| 2017/0329321 | A1 | 11/2017 | Dai et al. |
| 2018/0222050 | A1 | 8/2018 | Vu et al. |
| 2018/0333869 | A1 | 11/2018 | Ding et al. |
| 2019/0160675 | A1 | 5/2019 | Paschall, II et al. |
| 2019/0262993 | A1 | 8/2019 | Cole et al. |
| 2020/0097011 | A1 | 3/2020 | Mika et al. |
| 2020/0189103 | A1 | 6/2020 | D'Ercoli et al. |
| 2020/0361090 | A1 | 11/2020 | Rublee et al. |
| 2020/0391386 | A1 | 12/2020 | Verma et al. |
| 2021/0086374 | A1 | 3/2021 | Brandt et al. |
| 2021/0124356 | A1* | 4/2021 | Wolfe .................. G05D 1/0214 |
| 2021/0206367 | A1* | 7/2021 | Liu ....................... G08G 1/0112 |
| 2022/0105634 | A1 | 4/2022 | Oboril et al. |
| 2022/0105636 | A1 | 4/2022 | Oboril et al. |
| 2022/0111527 | A1* | 4/2022 | Buerkle ................. B25J 9/1676 |
| 2022/0118621 | A1 | 4/2022 | Paulitsch et al. |
| 2022/0126451 | A1 | 4/2022 | Hopkinson et al. |
| 2022/0203538 | A1 | 6/2022 | Ning |
| 2022/0305667 | A1 | 9/2022 | Murphy et al. |
| 2022/0395979 | A1 | 12/2022 | Beardsworth |
| 2023/0014536 | A1 | 1/2023 | Kamon et al. |
| 2023/0048039 | A1 | 2/2023 | Kokushi et al. |
| 2023/0122989 | A1 | 4/2023 | Wang et al. |
| 2023/0321831 | A1 | 10/2023 | Ames et al. |
| 2023/0384790 | A1 | 11/2023 | Singletary et al. |
| 2024/0061449 | A1 | 2/2024 | Ames et al. |
| 2024/0075620 | A1 | 3/2024 | Park et al. |
| 2024/0100702 | A1 | 3/2024 | Saunders et al. |
| 2024/0109195 | A1 | 4/2024 | Akiona et al. |
| 2024/0181637 | A1 | 6/2024 | Gillett |

OTHER PUBLICATIONS

Co-Pending U.S. Appl. No. 19/067,693, filed Feb. 28, 2025.
Co-Pending PCT Application No. PCT/US25/17985, filed Feb. 28, 2025.
International Search Report of Co-Pending PCT Application No. PCT/US25/17985.
Written Opinion of Co-Pending PCT Application No. PCT/US25/17985.
Scianca Nicola et al: "A behavior-based framework for safe deployment of humanoid robots" Mar. 14, 2021.
Takubo T et al: "Emergent walking stop using 3-D ZMP modification criteria map for humanoid robot" Apr. 10, 2007.
Zhou Yuhang et al: "Falling protective method for humanoid robots using arm compliance to reduce damage" Dec. 3, 2016.

\* cited by examiner

*350*

START

RECEIVE STOP COMMAND — *352a*

DECELERATE MOBILE ROBOT — *352b*

DETERMINE HAZARD INFORMATION — *352c*

DETERMINE CLEARANCE INFORMATION — *352d*

RECONFIGURE MOBILE ROBOT — *352e*

CAUSE SAFE OPERATING STOP — *352f*

END

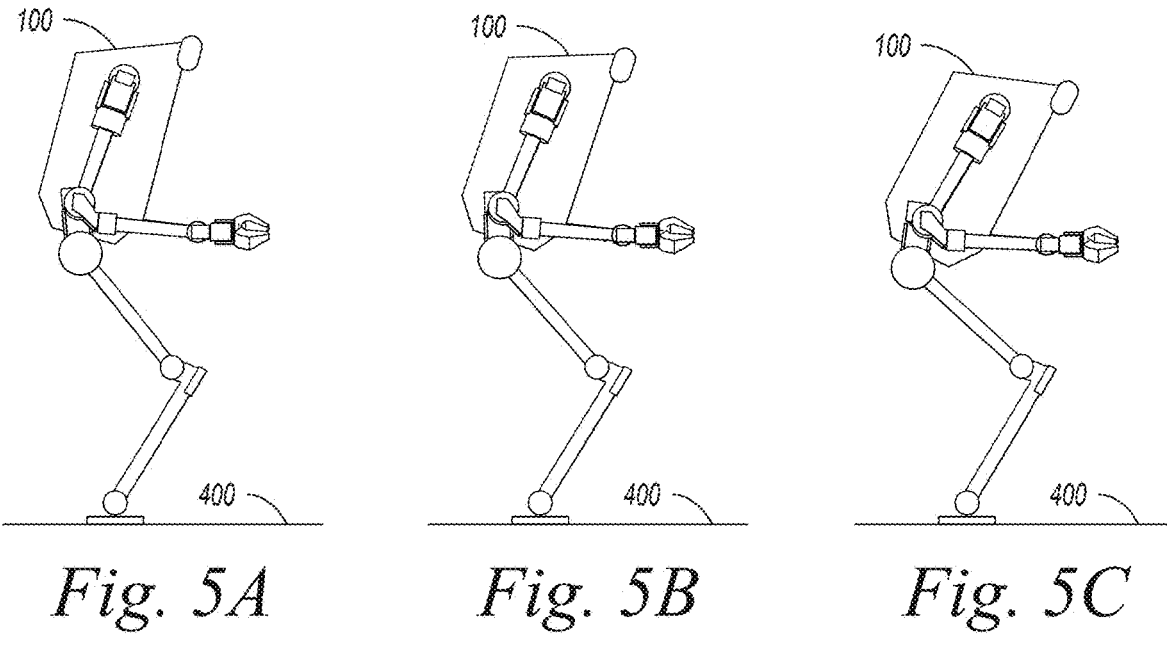
*Fig. 5A*   *Fig. 5B*   *Fig. 5C*
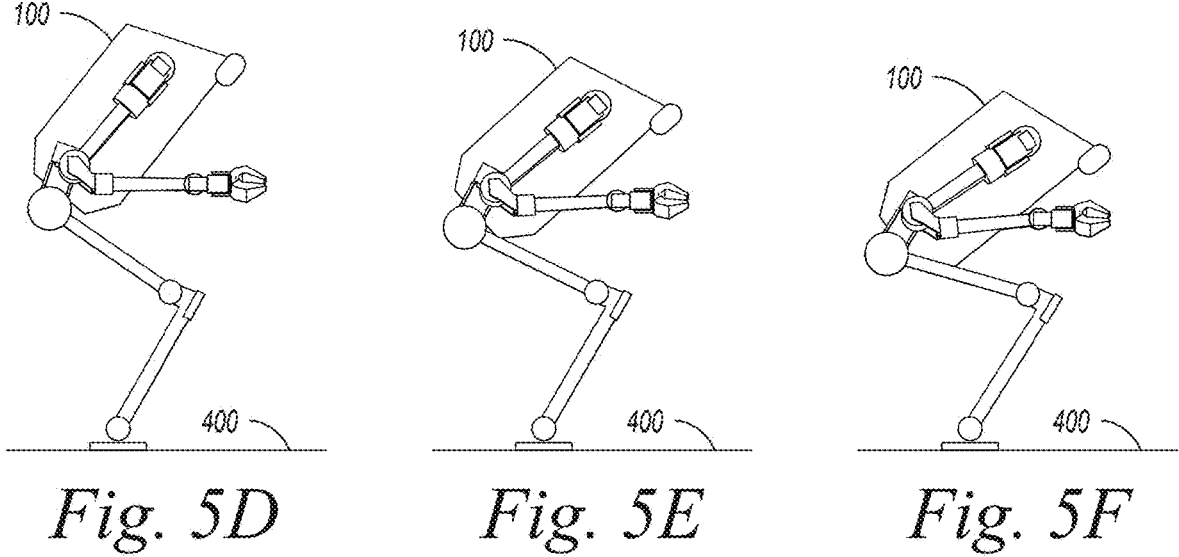
*Fig. 5D*   *Fig. 5E*   *Fig. 5F*

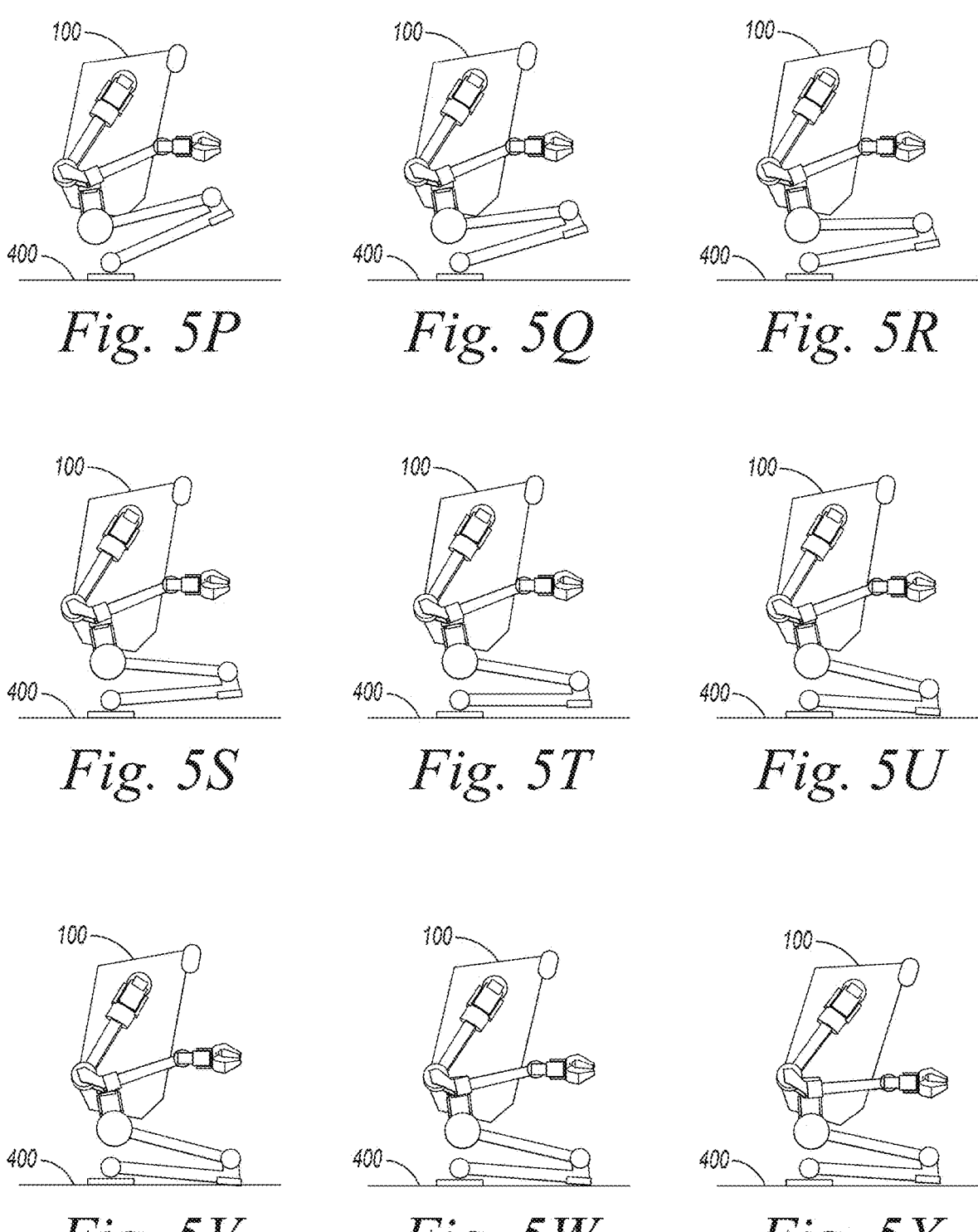
*Fig. 5P*          *Fig. 5Q*          *Fig. 5R*
*Fig. 5S*          *Fig. 5T*          *Fig. 5U*
*Fig. 5V*          *Fig. 5W*          *Fig. 5X*

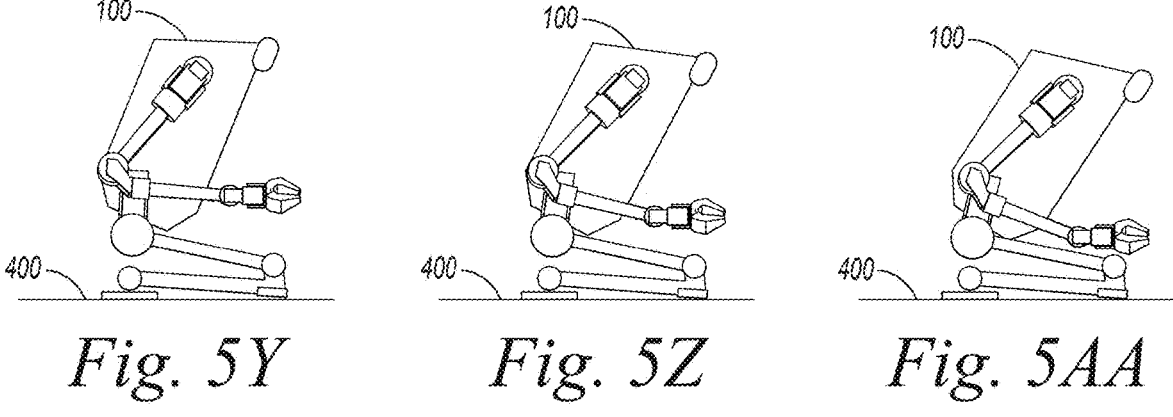
*Fig. 5Y*          *Fig. 5Z*          *Fig. 5AA*
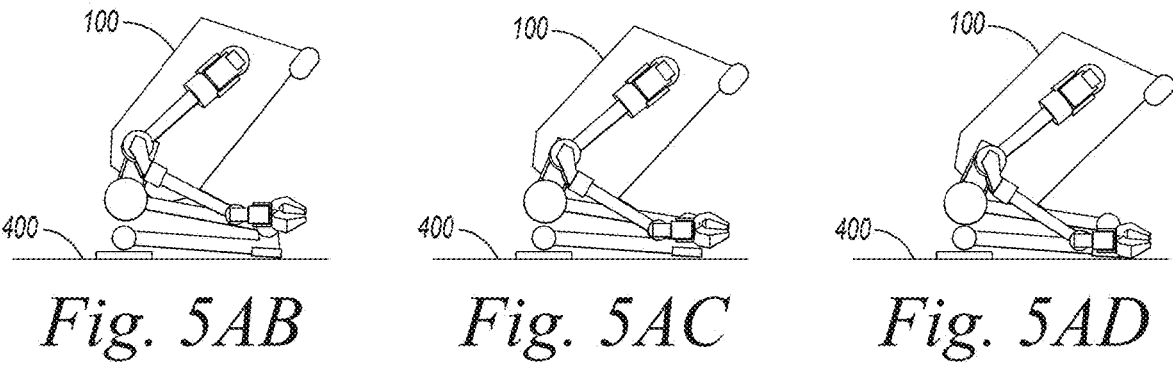
*Fig. 5AB*          *Fig. 5AC*          *Fig. 5AD*

ESCALATING HAZARD-RESPONSE OF DYNAMICALLY STABLE MOBILE ROBOT IN A COLLABORATIVE ENVIRONMENT AND RELATED TECHNOLOGY

CROSS-REFERENCE TO RELATED APPLICATION

This claims the benefit of U.S. Provisional Application No. 63/560,583, filed Mar. 1, 2024. The foregoing application is incorporated herein by reference in its entirety. To the extent the foregoing application or any other material incorporated by reference conflicts with the present disclosure, the present disclosure controls.

TECHNICAL FIELD

The present technology relates to control of dynamically stable mobile robots in collaborative environments.

BACKGROUND

Much of the work that humans currently perform is amenable to automation using robotics. For example, many human workers currently focus on executing predefined movements of items and containers at order-fulfillment centers. Such predefined movements may occur millions of times a day at a single order-fulfillment center and billions of times a day across a network of order-fulfillment centers. Human effort is better suited to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous features may be omitted when the appropriate reference-number labels for such analogous features are clear in the context of the specification and all of the drawings considered together. Furthermore, the same reference numbers may be used to identify analogous features in multiple described embodiments.

DETAILED DESCRIPTION

Figure 1:
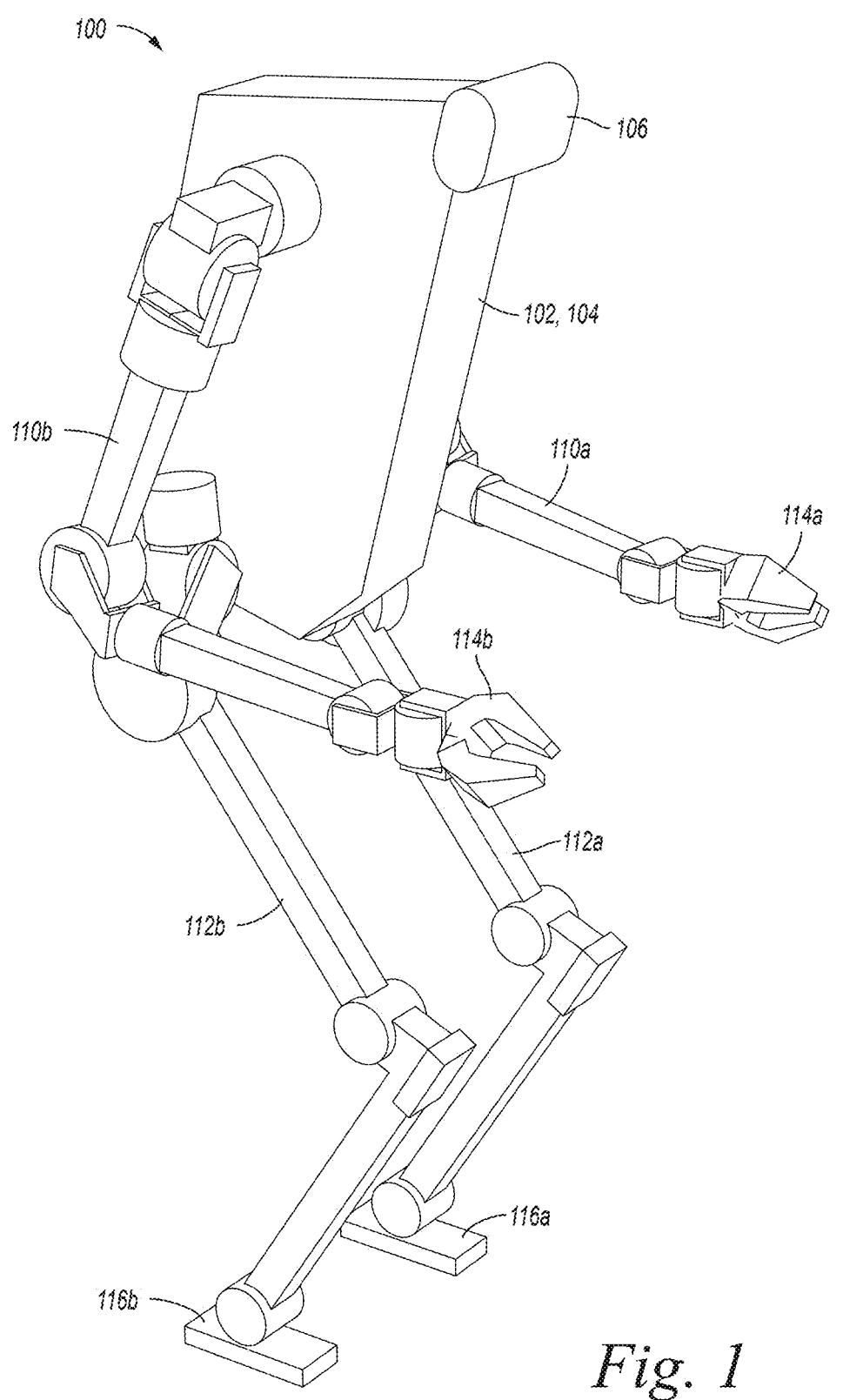
FIG. 1 is a perspective view of a mobile robot relevant to methods in accordance with at least some embodiments of the present technology.

Disclosed herein are methods, devices, and systems related to controlling dynamically stable robots. Dynamically stable robots rely on active control to maintain stability during normal operation. In contrast, statically stable robots operate in an inherently stable state. As an example, many conventional autonomous mobile robots (AMRs) currently used for warehouse logistics have four wheels and are statically stable. No active control is needed to maintain the stability of these robots during normal operation. If a statically stable AMR loses power or otherwise becomes disabled, it remains in a stable, stationary state rather than collapsing unpredictably. As another example, bipedal robots are dynamically stable in most, if not all cases. Such robots are always falling to some degree during normal operation. Dynamically stable robots maintain effective stability by monitoring state-related variables and making rapid pose adjustments to counteract destabilizing forces as needed. If a dynamically stable robot loses power or otherwise becomes disabled, it collapses. As yet another example, a quadrupedal robot may move between dynamically stable operation (e.g., while running) and statically stable operation (e.g., while walking or standing). Operating a robot in a dynamically stable state permanently or temporarily can be useful to increase speed, maneuverability, and range of motion, among other potential benefits. Indeed, a dynamically stable robot with a relatively compact footprint is typically able to execute a much wider range of behaviors than a statically stable robot with a similar footprint.

Operating a robot in a dynamically stable state also presents certain challenges. Perhaps most significant among these challenges are those related to hazard mitigation in collaborative environments. Robots, like other types of machinery, have the potential to harm humans. Historically, an approach to reducing the risk of a machine harming a human has been to ensure that the machine has features that allow a human to disable the machine quickly and intuitively. For example, a material feeder of an industrial machine is likely to have a highly accessible button (sometimes called an E-stop button) that allows an operator to deactivate the material feeder immediately if needed. If a hazardous situation arises (e.g., the material feeder snags the operator's clothing), the operator can press the button to cause the material feeder to stop moving. Once the material feeder stops moving, the operator can remedy the hazardous situation (e.g., free the snagged clothing) and avoid serious injury.

In the foregoing example, the hazard-mitigation potential of the disabling button is obvious. Because of cases like this, modern regulations and standards related to workplace safety often require that potentially hazardous machinery operated near humans include accessible and intuitive disabling features. Moreover, machine disabling may be required to occur automatically in some cases. Unfortunately, disabling a dynamically stable robot is not as straightforward as disabling a simple material feeder. As discussed above, dynamically stable robots collapse in the absence of active control. As a further challenge, dynamically stable robots may fall and/or collapse in other circumstances, such as in response to connectivity interruptions, slips, and strong impacts. These and certain other potential movements of dynamically stable robots may occur quickly and unpredictably. Accordingly, close encounters between humans and dynamically stable robots are potentially hazardous. Ironically, this includes close encounters associated with accessing and activating a disabling feature on such a robot.

One conventional strategy for hazard mitigation in the context of dynamically stable robots involves segregation. For example, dynamically stable robots can be confined to enclosed workcells that humans cannot access. Physical barriers, electronic fences, tethers, and/or other systems can be incorporated into an environment to enforce this segregation. While effective and relatively simple to implement, segregation strategies for hazard mitigation greatly reduce the productive potential of dynamically stable robots. For example, the tasks that dynamically stable robots facilitate often involve direct interaction with humans. In a particular example, it may be useful for dynamically stable robots to retrieve objects from and/or to deliver objects to humans directly. Furthermore, even when humans and dynamically stable robots work independently, it is usually desirable for the humans and the dynamically stable robots to share certain spaces, such as aisles and walkways.

Methods, devices, and systems in accordance with at least some embodiments of the present technology include innovation that promotes one or more useful objectives in the field of collaborative robotics. Such objectives may include facilitating the safe operation of dynamically stable robots in the presence of humans. In an example, a method in accordance with at least some embodiments of the present technology includes a variable (e.g., escalating) hazard response by a mobile robot. An overall hazard-mitigation strategy involving the mobile robot can include different features with different respective impacts on hazard reduction and efficiency. The mobile robot may implement these various features individually, collectively (e.g., in stages, tiers, levels, phases, etc.), sequentially, simultaneously, or otherwise based at least partially on real time or near real time information about an environment in which the mobile robot operates. For example, the mobile robot may implement features that increasingly prioritize hazard reduction over efficiency in response to information indicating an increasing level of risk to a human in the environment. In addition or alternatively, the mobile robot may use information about the environment to determine whether implementing a given feature is feasible and/or safe. The relationship between the hazard-reduction potential of a given feature and the state of the environment can be complex. Indeed, some features may reduce a level of risk to a nearby human in some cases and increase the level of risk in other cases. Methods, devices, and systems in accordance with at least some embodiments of the present technology address this complexity in an innovative manner.

The foregoing and many other features of methods, devices, and systems in accordance with various embodiments of the present technology are further described below with reference to FIGS. 1-8 Although methods, devices, and systems may be described herein primarily or entirely in the context of bimanual, bipedal robots, other contexts are within the scope of the present technology. For example, suitable features of described methods, devices, and systems can be implemented in the context of mobile robots with one arm, in the context of mobile robots with more than two arms, and/or in the context of non-legged mobile robots. Accordingly, the word "bipedal" as used herein may be replaced with "mobile" to encompass non-bipedal counterparts within the present technology unless the context clearly indicates otherwise. Furthermore, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Mobile Robots

FIG. 1 is a perspective view of a mobile robot 100 relevant to methods in accordance with at least some embodiments of the present technology. As shown in FIG. 1, the mobile robot 100 can be humanoid in form. It can include structures resembling human anatomy with respect to the features, positions, and/or other characteristics of such structures. In at least some cases, the mobile robot 100 defines a midsagittal plane (not shown) about which it is bilaterally symmetrical. In these and other cases, the mobile robot 100 can be configured for mobile locomotion similar to that of a human. Counterparts of the mobile robot 100 can have other suitable features. For example, a counterpart of the mobile robot 100 can have a non-humanoid form, such as a canine form, an insectoid form, an arachnoid form, or a form with no animal analog. Furthermore, a counterpart of the mobile robot 100 can be asymmetrical or have symmetry other than bilateral. Still further, a counterpart of the mobile robot 100 can be configured for non-bipedal locomotion. For example, a counterpart of the mobile robot 100 can be configured for another type of legged locomotion (e.g., quadrupedal locomotion, hexapedal locomotion, octopedal locomotion, etc.) or non-legged locomotion (e.g., wheeled locomotion, continuous-track locomotion, etc.).

With reference again to FIG. 1, the mobile robot 100 can include a centrally disposed body 102 through which other structures are interconnected. As all or a portion of the body 102, the mobile robot 100 can include a torso 104. The mobile robot 100 can further include a head 106 at a superior portion of the torso 104. The mobile robot 100 can also include articulated appendages carried by the torso 104. Among these articulated appendages, the mobile robot 100 can include arms 110 (individually identified as arms 110a, 110b) and legs 112 (individually identified as legs 112a, 112b). At individual articulations of the arms 110a, 110b and legs 112a, 112b, the mobile robot 100 can include a joint and a corresponding actuator, such as a rotary actuator with a motor and gearing (e.g., cycloidal gearing or strain-wave gearing). Rather than being positioned at a joint, some actuators of the mobile robot 100 may be operably associated with a joint via a connecting structure, such as a connecting rod or a cable. For clarity of illustration, the joints, actuators, and connecting structures of the mobile robot 100 are not labeled in FIG. 1.

The mobile robot 100 can be configured to manipulate objects via the arms 110*a,* 110*b,* such as bimanually. The mobile robot 100 can be configured to ambulate via the legs 112*a,* 112*b,* such as bipedally. The arms 110*a,* 110*b* and the legs 112*a,* 112*b* can separately extend from the body 102 and define respective kinematic chains. The individual kinematic chains corresponding to the arms 110*a,* 110*b* can provide at least five degrees of freedom, such as exactly five or exactly six degrees of freedom. In these and other cases, the respective kinematic chains corresponding to the legs 112*a,* 112*b* can provide at least four degrees of freedom, such as exactly four, exactly five, or exactly six degrees of freedom. As parts of the arms 110*a,* 110*b* and at distalmost portions of the corresponding kinematic chains, the mobile robot 100 can include end effectors 114*a,* 114*b.* Similarly, as parts of the legs 112*a,* 112*b* and at distalmost portions of the corresponding kinematic chains, the mobile robot 100 can include feet 116*a,* 116*b.* Thus, the arms 110*a,* 110*b* and the legs 112*a,* 112*b* can distally carry the end effectors 114*a,* 114*b* and the feet 116*a,* 116*b,* respectively.

As mentioned above, a counterpart of the mobile robot 100 can be a wheeled mobile robot including one or more wheels instead of or in addition to the feet 116*a,* 116*b.* The wheels can be configured to interact with a ground surface while the wheeled mobile robot is in motion. In an example, the wheeled mobile robot is the same as or similar to the mobile robot 100 superior to the feet 116*a,* 116*b.* Instead of the feet 116*a,* 116*b,* the wheeled mobile robot can include a wheeled base. The legs 112*a,* 112*b* can extend between wheeled base and the body 102. In another example, a single counterpart of the legs 112*a,* 112*b* can extend between the wheeled base and the body 102. Like the mobile robot 100, the wheeled mobile robot can be dynamically stable in that it relies on active control to maintain stability during normal operation. This is typical, for example, when an overall footprint of the wheeled base on a ground surface is relatively small. The active control can be implemented at least partially by changing respective poses of links of the wheeled mobile robot superior to the wheeled base. Accordingly, deceleration, reconfiguration, and other aspects of a variable hazard-response strategy in accordance with at least some embodiments of the present technology can be implemented via the wheeled mobile robot. It should be understood, therefore, that the wheeled mobile robot can be substituted for the mobile robot 100 in descriptions herein of at least some embodiments of the present technology unless the context clearly indicates otherwise.

Examples of Methods

Figure 2:
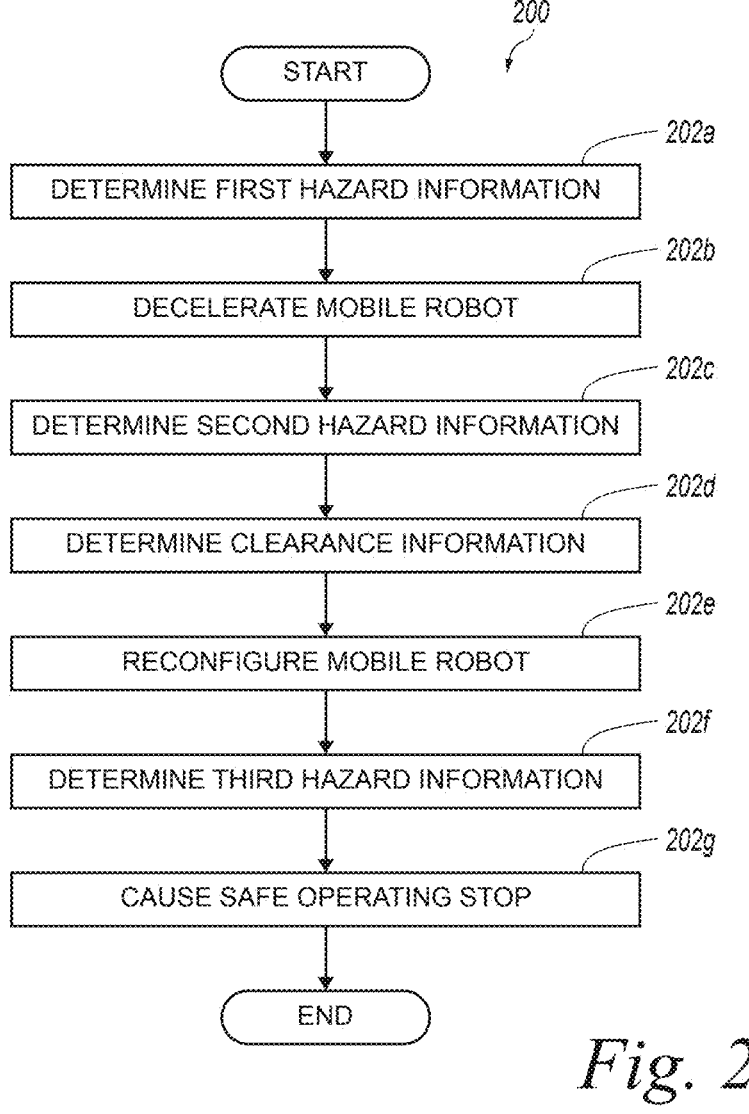
FIG. 2 is a block diagram corresponding to a method in accordance with at least some embodiments of the present technology.

FIG. 2 is a block diagram corresponding to a method 200 in accordance with at least some embodiments of the present technology. The diagram includes blocks 202*a*-202*g* corresponding to different respective portions of the method 200. Features of the method 200 are described herein primarily in the context of the mobile robot 100. It should be understood, however, that various examples of the method 200 can be implemented in accordance with other mobile robots, such as the wheeled mobile robot described above. Furthermore, suitable aspects of the method 200 can be implemented at least partially via a computer system (not shown) operably associated with the mobile robot 100. Where aspects of the method 200 are described herein as performed by the mobile robot 100, it should be understood that these descriptions include performing such aspects entirely or partially by the computer system. Further details regarding various examples of the computer system are provided below in the context of FIGS. 7 and 8. The mobile robot 100 can carry the computer system. Alternatively, all or a portion of the computer system can be remote and operably associated with the mobile robot 100 via suitable communication hardware.

In at least some cases, the method 200 occurs while the mobile robot 100 is in an environment that also includes a human. This may be referred to herein as a collaborative environment even if no direct collaboration between the mobile robot 100 and the human occurs. Examples of the environment include warehouses, order-fulfilment centers, stockrooms, and retail centers, among many others. In general, examples of the method 200 can be useful in any environment in which the mobile robot 100 and a human are in close enough proximity that operation of the mobile robot 100 corresponds to a safety hazard for the human absent adequate hazard mitigation. Moreover, the method 200 can be useful even in segregated environments. For example, the method 200 may be useful to reduce hazards for humans who service mobile robots that would otherwise be segregated from humans in an environment.

With reference now to FIGS. 1 and 2 together, the method 200 can include determining first hazard information about the human in the environment at a first time (block 202*a*). This can occur via the computer system. Furthermore, determining the first hazard information can occur while the mobile robot 100 is dynamically stable and operating in the environment. For example, determining the first hazard information can occur while the mobile robot 100 is ambulating within the environment via the legs 112*a,* 112*b.* In connection with determining the first hazard information, the method 200 can include sensing the human. The mobile robot 100 can capture sensor data corresponding to the human via one or more sensors. The captured sensor data can include LiDAR (Light Detection and Ranging) data, stereoscopic data, RGB (Red, Green, Blue) data, SONAR (Sound Navigation and Ranging) data, and/or data of one or more other suitable types. In at least some cases, the method 200 includes pre-processing the sensor data, such as by filtering irrelevant data and/or by fusing relevant data from two or more different sensing modalities.

Sensing the human can include sensing a presence of the human and/or sensing a variable related to the human. Examples of such variables include location, trajectory, speed, and state (e.g., encumbered, unencumbered, alert, distracted, etc.). Location, trajectory, and/or certain other location-related variables corresponding to the human can be relative to a reference frame in which the mobile robot 100 also determines its own location. In at least some cases, the first hazard information includes a proximity of the human to the mobile robot 100 at the first time. In addition or alternatively, the first hazard information can include a trajectory of the human at the first time. Also in addition or alternatively, the first hazard information can include a speed of the human at the first time. Also in addition or alternatively, the first hazard information can include a state of the human at the first time.

The method 200 can include processing sensor data on a human via a suitable algorithm and/or model. As an example, the method 200 can include processing the sensor data via a SLAM (Simultaneous Localization and Mapping) algorithm. In connection with this processing and/or in another context, the method 200 can include sensing different locations of the human at different respective times and using the locations along with an elapsed time between the sensing instances to determine a velocity of the human. Relatedly, the method 200 can include providing sensor data to a machine-learning model (e.g., a convolutional neural network) trained to recognize humans and/or human states. As an example, the method can include providing raw sensor data on the environment to a first machine-learning model trained to separate human-related data from extraneous data. An example of this first model is YOLOV8 (Ultralytics Inc.). The method can then include providing human-related data from the first model to a second model trained to determine human states based on the human-related data. An example of this second model is AMAZON REKOGNITION (Amazon Web Services, Inc.). Moreover, sensing the location, trajectory, speed, state, and/or other variables related to the human can make use of the same or different sensor data.

The method 200 can further include decelerating the mobile robot 100 based at least partially on the first hazard information (block 202*b*). This can include transitioning the mobile robot 100 from a transportation state (e.g., an ambulating state) to a non-transportation state (e.g., a standing state). Relatedly, decelerating the mobile robot 100 can include moving one of the feet 116*a*, 116*b* into contact with a ground surface while the other of the feet 116*a*, 116*b* is in contact with the ground surface. Moreover, decelerating the mobile robot 100 can include slowing movement of one or more actuators of the mobile robot 100. The mobile robot 100, however, can be dynamically stable both before and after decelerating. Accordingly, small movements of the mobile robot 100 for balance may occur both before and after decelerating. In at least some cases, the first hazard information indicates a relatively low level of risk of collision between the mobile robot 100 and the human. Decelerating the mobile robot 100 tends to be fast and reliable both to implement and to reverse. For at least these and/or other reasons, decelerating the mobile robot 100 can be an appropriate response to a relatively low level of risk of collision between the mobile robot 100 and the human.

The method 200 can also include determining second hazard information about the human at a second time after the first time (block 202*c*). The second time can be while the mobile robot 100 decelerates, immediately after the mobile robot 100 decelerates, or otherwise after the mobile robot 100 decelerates. For example, as discussed in further detail below, the method 200 can include standing and waiting while monitoring the human. The second hazard information can include information about the human collected during this monitoring. The type of the second hazard information can be the same as or different from the type of the first hazard information. Furthermore, the second hazard information can include a proximity of the human to the mobile robot 100 at the second time, a trajectory of the human at the second time, a speed of the human at the second time, and/or a state of the human at the second time. As with determining the first hazard information, determining the second hazard information can occur via the computer system, while the mobile robot 100 is dynamically stable, and while the mobile robot 100 is operating in the environment. In at least some cases, determining the second hazard information includes gathering sensor data on the environment at the second time, providing the sensor data to a machine-learning model, and receiving the second hazard information as an output from the machine-learning model. For example, the method 200 can include gathering sensor data on a gaze of the human at the second time and providing this sensor data to a machine-learning model trained to determine whether the human is distracted. An example of a model useful for determining state information about the human is REKOGNITION (Amazon Web Services, Inc.). Other approaches to determining state information relevant to a hazard-mitigation strategy by the mobile robot 100 are also possible.

The method 200 can also include determining clearance information about a portion of the environment around the mobile robot 100 (block 202*d*). Again, this can occur via the computer system, while the mobile robot 100 is dynamically stable, and while the mobile robot 100 is operating in the environment. Furthermore, determining the clearance information can occur at the second time or at another suitable time. Moreover, determining the clearance information can occur while the mobile robot 100 decelerates, immediately after the mobile robot 100 decelerates, or otherwise after the mobile robot 100 decelerates. The clearance information can include information about physical obstructions in the vicinity of the mobile robot 100. As discussed below, the presence of such obstructions can be relevant to how the mobile robot 100 reconfigures itself as part of an overall hazard-mitigation strategy. Determining the clearance information can include sensing by the mobile robot 100 that is the same as or similar to the sensing described above in the context of determining the first hazard information and the second hazard information. In at least some cases, determining the clearance information includes collecting data on an object in the environment (e.g., a shelf, a wall, a box, etc.), and processing the data to determine a distance between the object and the mobile robot 100. The data can indicate this distance directly (e.g., when the data includes LiDAR data) and/or indirectly. In the latter case, the computer system may determine the clearance information via a SLAM algorithm.

The method 200 can also include reconfiguring the mobile robot 100 based at least partially on the second hazard information and the clearance information (block 202*e*). Reconfiguring the mobile robot 100 can include changing a pose of the mobile robot 100 to reduce the risk of injury to a human in the environment. In at least some cases, reconfiguring the mobile robot 100 includes lowering the center-of-gravity of the mobile robot 100. At a high level, reconfiguring the mobile robot 100 can include moving the mobile robot 100 from a standing configuration to a non-standing configuration, crouching the mobile robot 100, kneeling the mobile robot 100, and/or other behaviors. At a lower level, reconfiguring the mobile robot 100 can include bending a knee joint of the mobile robot 100, tilting the torso 104 anteriorly, and/or other suitable movements of the mobile robot 100 that are further to a higher-level behavior or that otherwise reduce a risk of injury to the human. One example of a reconfiguration of the mobile robot 100 is described in detail below with reference to FIGS. 5A-6.

Reconfiguring the mobile robot 100 can reduce a fault-state fall extent of the mobile robot 100 (e.g., by at least 30%, by at least 50%, etc.). Fault-state fall extent is a maximum distance in which contact with the mobile robot 100 is possible upon and/or shortly after a fault event. The fault-state fall extent of the mobile robot 100 can be defined in a plane parallel to a ground plane under the mobile robot 100 and further defined relative to a vertical reference line that approximates a center of the mobile robot 100. In general, a fault event is a transition of the mobile robot 100 from a non-fault state (e.g., a regular state, a working state, an uninterrupted state, a functional state, a non-disabled state, etc.) to a fault state (e.g., an irregular state, a non-working state, an interrupted state, a non-functional state, a disabled state, etc.). In practice, the transition can occur by default or in response to a command. Furthermore, the transition can occur in conjunction with loss of power to the mobile robot 100, loss of connectivity with the mobile robot 100, and/or breach of a boundary around the mobile robot 100, among other examples.

As shown in FIG. 2, the method 200 can further include determining third hazard information about the human at a third time (block 202*f*). The type of the third hazard information can be the same as or different from the type of the first hazard information. Likewise, the type of the third hazard information can be the same as or different from the type of the second hazard information. For example, the third hazard information can include a proximity of the human to the mobile robot 100 at the third time, a trajectory of the human at the third time, a speed of the human at the third time, and/or a state of the human at the third time. As with determining the first and second hazard information, determining the third hazard information can occur via the computer system, while the mobile robot 100 is dynamically stable, and while the mobile robot 100 is operating in the environment. The third time can be while the mobile robot 100 reconfigures, immediately after the mobile robot 100 reconfigures, or otherwise after the mobile robot 100 reconfigures. For example, as discussed in further detail below, the method 200 can include kneeling and waiting by the mobile robot 100 while monitoring the human. The third hazard information can include information about the human collected during this monitoring.

The method 200 can also include causing a safe operating stop of the mobile robot 100 based at least partially on the third hazard information (block 202*g*). Relatedly, the mobile robot 100 can be in a statically stable state immediately after reconfiguring. While in a safe operating stop, the mobile robot 100 may halt all movement without completely shutting down. For example, the mobile robot 100 may operate under a control regime that overrides inputs that would otherwise cause the mobile robot 100 to move. Exiting this control regime may require a special input, such as an affirmative input from a human operator. In an example, a human operator with special training may visually confirm (e.g., in-person or remotely by video) that releasing the mobile robot 100 from a safe operating stop is safe. The operator may then send an instruction to the mobile robot 100 (e.g., wirelessly via a handheld device) that releases the mobile robot 100 from the safe operating stop. After receiving and authenticating the instruction, the mobile robot 100 may exit the safe operating stop and resume normal operation. Other forms of safe operating stop with greater or lesser restriction on movement of the mobile robot 100 are also possible.

Decelerating the mobile robot 100, reconfiguring the mobile robot 100, and causing a safe operating stop of the mobile robot 100 are different approaches to hazard mitigation. These approaches involve different tradeoffs between efficiency and risk reduction, among other considerations. In many cases, decelerating the mobile robot 100, reconfiguring the mobile robot 100, and causing a safe operating stop of the mobile robot 100 cause increasingly greater losses of efficiency while providing increasingly greater risk reduction. Using hazard information to inform the implementation of these approaches can be advantageous. In at least some cases, the first, second, and third hazard information indicate different (e.g., escalating) respective levels of risk of collision between the mobile robot 100 and the human. In an example, a closer proximity of the human to the mobile robot 100 can indicate a greater risk than a more distant proximity. Moreover, the first, second, and third hazard information can indicate different respective levels of compliance by the human with a safety protocol. In an example, the first hazard information may indicate that the human is in compliance with a safety protocol, but is nevertheless close enough to the mobile robot 100 to warrant deceleration of the mobile robot 100. The second hazard information in this example, may indicate that the human is out of compliance with a safety protocol such that both deceleration and reconfiguration of the mobile robot 100 are warranted even if a distance between the mobile robot 100 and the human is significant. As examples of non-compliance, the second hazard information may indicate that the human is in a portion of the environment that should be off limits, that the human is moving at a speed that exceeds a walking speed, etc.

The relationship between the hazard information and the various approaches to hazard mitigation by the mobile robot 100 can be complex. Certain situations may call for a deceleration of the mobile robot 100 without a reconfiguration of the mobile robot 100 even if the level of risk to the human is relatively high. For example, at the first time, the human may already be very close to the mobile robot 100 such that the risk of the mobile robot 100 falling on the human is already present or imminent. This may occur, for example, at a blind corner or when the human is running. In such cases, a reconfiguration of the mobile robot 100 may increase rather than decrease the risk to the human. Reconfiguration, in contrast to standing and waiting, takes time and involves additional movement of the mobile robot 100. If the human breaches a close boundary around the mobile robot 100 or even touches the mobile robot 100 while the mobile robot 100 is reconfiguring, the risk to the human may be higher than if this occurs while the mobile robot 100 is standing and waiting.

Many permutations of hazard information and responses by the mobile robot 100 are potentially useful. For example, the mobile robot 100 may reconfigure based at least partially on the proximity of the human to the mobile robot 100 at the second time being above a threshold, being below a threshold, and/or being between two thresholds. Relatedly, the method 200 can include monitoring for breach of one or more boundaries around the mobile robot 100. The mobile robot 100 can receive an indication of the breach as hazard information and respond appropriately. The response can include decelerating the mobile robot 100 upon breach of a distant first boundary, reconfiguring the mobile robot 100 upon breach of a closer second boundary, and causing a safe operating stop of the mobile robot 100 upon breach of an even closer third boundary. In at least some cases, the method 200 includes visually indicating one or more such boundaries (e.g., the second boundary in the foregoing example) to humans in the environment. This can help the humans avoid inadvertently triggering a reconfiguration of the mobile robot 100, among other potential benefits. As another example, the mobile robot 100 may reconfigure based at least partially the speed of the human at the second time being above a threshold, being below a threshold, and/or being between two thresholds. Furthermore, a response by the mobile robot 100 may depend on a combination of different types of hazard information. For example, the mobile robot 100 may decelerate based on a proximity of the human to the mobile robot 100 being between two thresholds and reconfigure when both this condition is met and a state of the human is distracted and/or encumbered.

Figure 3:
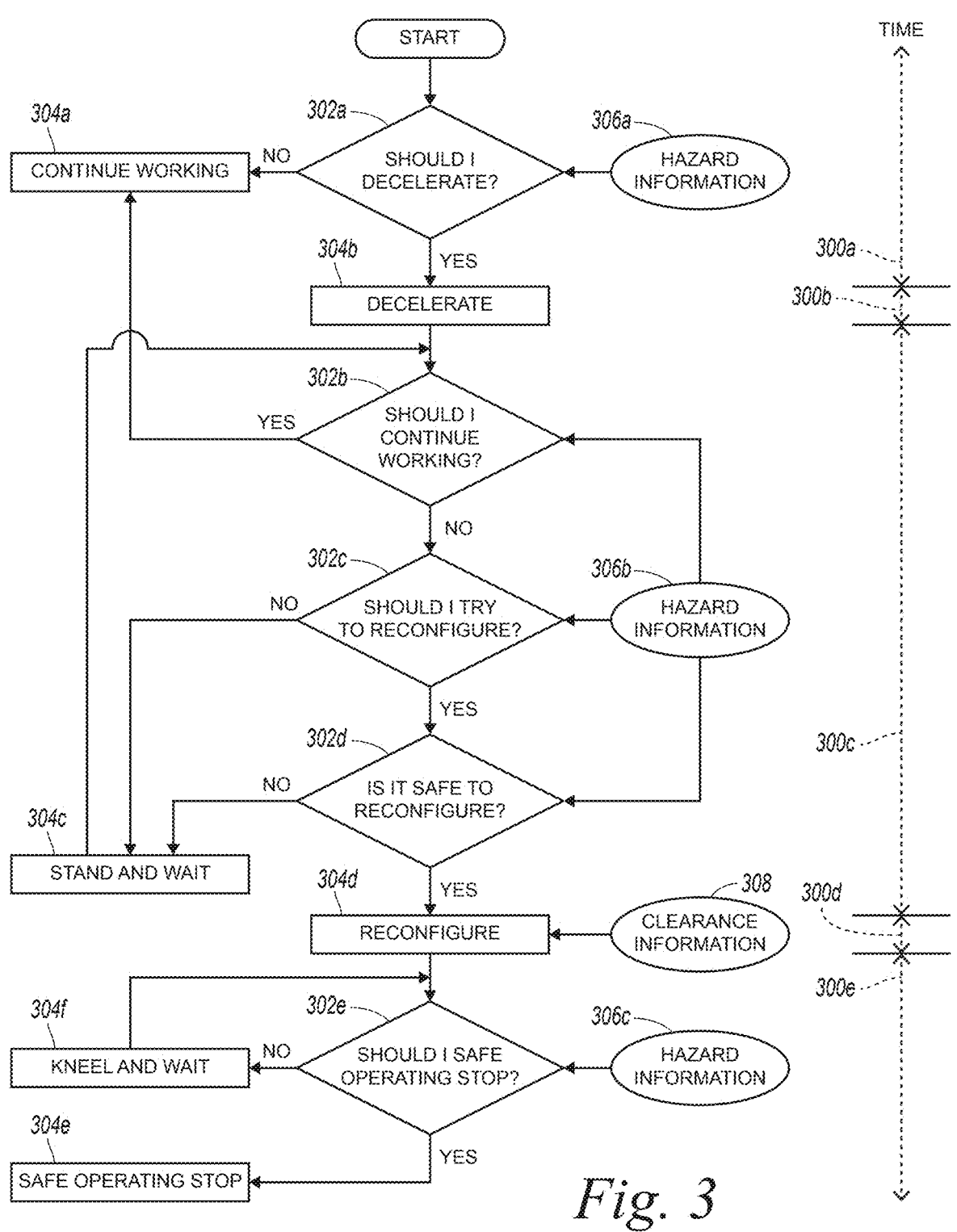
FIG. 3 is a decision-tree diagram relevant to the method of FIG. 2.

FIG. 3 is a decision-tree diagram relevant to the method 200. With reference to FIGS. 1-3 together, operations within the method 200 can occur during time periods 300 (individually identified as time periods 300a-300e) corresponding to decelerating and reconfiguring the mobile robot 100. The time period 300a can be before the mobile robot 100 decelerates. The time period 300b can be while the mobile robot 100 decelerates. The time period 300c can be after the mobile robot 100 decelerates and before the mobile robot 100 reconfigures. The time period 300d can be while the mobile robot 100 reconfigures. Finally, the time period 300e can be after the mobile robot 100 reconfigures. As shown in FIG. 3, the method 200 can include decisions 302 (individually identified as decisions 302a-302e) and actions 304 (individually identified as actions 304a-304f). The decisions 302 can be based at least partially on hazard information 306 (individually identified as hazard information 306a-306c). In at least some cases, the hazard information 306a is the first hazard information discussed above in the context of FIG. 2, the hazard information 306b is the second hazard information discussed above in the context of FIG. 2, and the hazard information 306c is the third hazard information discussed above in the context of FIG. 2. As with suitable aspects of the method 200 discussed above in the context of FIG. 2, it should be understood that suitable aspects of the method 200 discussed in the context of FIG. 3 can be implemented at least partially via the computer system operably associated with the mobile robot 100 as discussed below in the context of FIGS. 7 and 8.

With reference again to FIGS. 1-3 together, the method 200 can include the decision 302a about whether to continue working (action 304a) or to decelerate (action 304b) based at least partially on the hazard information 306a. When the decision 302a is to continue working, the mobile robot 100 can forgo any motion-based safety response. It may be useful, however, for the mobile robot 100 to implement one or more other types of responses to the hazard information 306a, such to emit an audio warning, to emit a visual warning, etc. The decision 302a can occur during the time period 300a. When the decision 302a is to decelerate (e.g., because the hazard is above a threshold), the mobile robot 100 can proceed with decelerating during the time period 300b. After decelerating, the method 200 can include the decision 302b about whether to continue working or to stand and wait (action 304c) based at least partially on the hazard information 306b. When the decision 302b is to continue working, the mobile robot 100 can resume execution of a plan that was in progress before decelerating. When the decision 302b is not to continue working (e.g., because a sufficient hazard is still present after decelerating), the method 200 can include the decision 302c about whether to reconfigure (action 304d) or to stand and wait also based at least partially on the hazard information 306b. In some cases, the hazard may be high enough to warrant remaining decelerated, but still low enough not to warrant further efficiency loss from reconfiguring.

When the decision 302c is to reconfigure (e.g., because the hazard has increased beyond a another threshold), the method 200 can include the decision 302d about whether it is safe to reconfigure based at least partially on the hazard information 306b. As discussed above, when there is insufficient time to reconfigure (e.g., because a human is very close to the mobile robot 100 and/or is moving toward the mobile robot 100 very quickly) and in other cases, it may be safer for the mobile robot 100 to stand and wait rather than to reconfigure. The decisions 302b-302d can occur during the time period 300c. Moreover, the decisions 302b-302d can cycle at a suitable interval (e.g., 1 Hz, 10 Hz, etc.) while the mobile robot 100 stands and waits for the hazard information 306b to change.

When the decision 302d is that it is safe to reconfigure, the mobile robot 100 can proceed with reconfiguring during the time period 300d. In the illustrated case, the reconfiguring is assumed to move the mobile robot 100 to a kneeling configuration as an example. Other types of reconfiguring (e.g., sitting, lying down, crouching, squatting, etc.) that reduce a safety risk to the human are also possible. The method 200 can also include selecting among two or more different candidate reconfigurations based at least partially on clearance information 308. For example, there may be room for the mobile robot 100 to implement one type of reconfiguration, but not another. Similarly, although not shown in FIG. 3, the method 200 can include selecting among two or more different candidate reconfigurations based at least partially on the hazard information 306b. For example, the method 200 can include selecting a candidate reconfiguration that appropriately balances a risk to a human with a loss of efficiency. In addition or alternatively, the method 200 can include changing the type of reconfiguration during the time period 300d. For example, the mobile robot 100 may implement a series of reconfiguration types that increasingly reduce risk to a human (and cause increasing efficiency losses) in real time or in near real time as the hazard information 306b indicates an increasing risk to the human during the time period 300d. Relatedly, the method 200 can include aborting and/or reversing a reconfiguration in progress during the time period 300d based at least partially on the hazard information 306c.

After reconfiguring, the method 200 can include the decision 302e about whether to safe operating stop (action 304e) or to kneel and wait (action 304f) based at least partially on the hazard information 306c. The decision 302e can occur during the time period 300e. Moreover, the decision 302e can cycle at a suitable interval (e.g., 1 Hz, 10 Hz, etc.) while the mobile robot 100 kneels and waits for the hazard information 306c to change. In at least some cases, moving from a post-reconfiguration state to a safe operating stop involves no further movement of the mobile robot 100. Instead, a potential of the mobile robot 100 to reverse the reconfiguration (not shown in FIG. 3) based on the hazard information 306c may be present when the mobile robot 100 is in the post-reconfiguration state and absent or limited when the mobile robot 100 is in the safe operating stop. As discussed above, recovery of the mobile robot 100 from the safe operating stop may involve manual intervention.

Candidate reconfiguration types available to the mobile robot 100 may correspond to different respective target poses of the mobile robot 100 (e.g., kneeling, sitting, lying down, crouching, squatting, etc.). In addition or alternatively, candidate reconfiguration types available to the mobile robot 100 may correspond to different respective movements of the mobile robot 100. Moreover, candidate reconfiguration types can be associated with reconfiguration characteristics (e.g., implementation time, collision envelope during reconfiguration, footprint after reconfiguration, etc.). The method 200 can include selecting among available candidate reconfiguration types via one or more algorithms and/or models in which the hazard information 306b, the clearance information 308, and reconfiguration characteristics are inputs.

In an example, the mobile robot 100 identifies information about objects in the environment and compares this information to information about a candidate reconfiguration. Information about the objects can include locations, poses, trajectories, volumes, etc. of the objects. Information about a candidate reconfiguration can include locations, poses, trajectories, volumes, etc. of the mobile robot 100 before, during, and/or after the mobile robot 100 implements the candidate reconfiguration. If the information about the objects and the information about the candidate reconfiguration indicate that a collision between the mobile robot 100 and the objects is unlikely to occur (e.g., because poses of the mobile robot 100 corresponding to the reconfiguration do not overlap poses of stationary objects, because trajectories of the mobile robot 100 corresponding to the reconfiguration do not intersect trajectories of moving objects, etc.), then the mobile robot 100 selects the candidate reconfiguration. If the information about the objects and the information about the candidate reconfiguration indicates that a collision between the mobile robot 100 and the objects is likely to occur (e.g., because poses of the mobile robot 100 corresponding to the reconfiguration overlap poses of stationary objects, because trajectories of the mobile robot 100 corresponding to the reconfiguration intersect trajectories of moving objects, etc.), then the mobile robot 100 attempts the comparison again for a different candidate reconfiguration. Other criteria for selecting a reconfiguration are also possible. For example, the mobile robot 100 may select certain reconfigurations when holding a payload and others when not holding a payload. Furthermore, if the mobile robot 100 determines that no candidate reconfigurations are available that avoid a collision, the mobile robot 100 may then implement a default reconfiguration.

Methods in accordance with at least some embodiments of the present technology include implementing an unplanned protective stop of the mobile robot 100 at least partially in response to a stop command in addition to or instead of in response to dynamic hazard information. In the context of controlling industrial machinery, there are several stop categories relevant to stop commands. A Category-0 stop is a stop in which power to machinery is discontinued immediately after the stop is triggered. A Category-1 stop is a controlled stop in which power to machinery remains available while the stop is implemented and is then discontinued after the stop is implemented. Finally, a Category-2 stop is a controlled stop in which power to machinery remains available after the stop is implemented. Stops in accordance with at least some embodiments of the present technology are protective and controlled forms of Category-1 and Category-2 stops.

Implementing a stop in accordance with at least some embodiments of the present technology can include moving the mobile robot 100 into a low-energy position before powering-off the mobile robot 100. This can be at least partially in response to receiving a stop command. As an example, the stop command may be associated with loss of a status communication (e.g., a heartbeat communication, a watchdog communication, etc.) between an external device (e.g., a beacon) and the mobile robot 100. As other examples, the stop command may be associated with activation of an on-robot disabling switch (e.g., an on-robot E-stop button), activation of a remote disabling switch (e.g., a handheld E-stop button), and/or receiving one or more signals from another safety-related device (e.g., a safety interlock, a chaperone tether, a barrier, a presence-sensing device, an entry-monitoring device, etc.). In still other examples, the mobile robot 100 generates a stop command autonomously, such as at least partially in response to a diagnostic criteria. Examples of relevant diagnostic criteria include those indicating low power, loss of communication, a torque-sensing error, etc.

Figure 4:
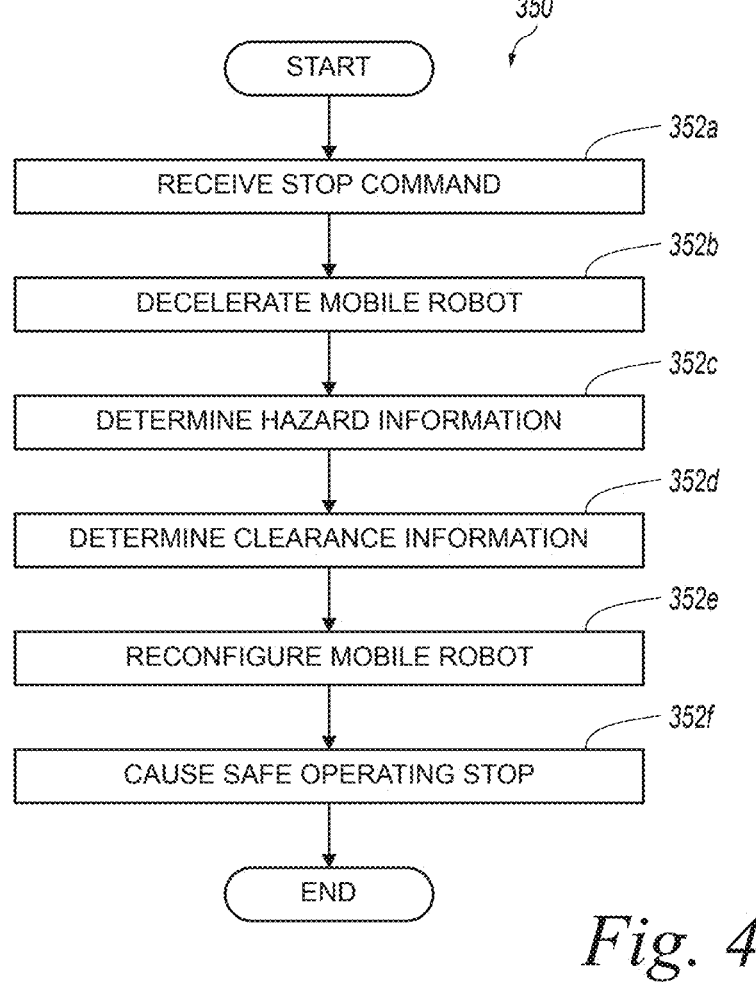
FIG. 4 is a block diagram corresponding to a method in accordance with at least some embodiments of the present technology.

FIG. 4 is a block diagram corresponding to a method 350 in accordance with at least some embodiments of the present technology. The diagram includes blocks 352a-352f corresponding to different respective portions of the method 350. As with the method 200, features of the method 350 are described herein primarily in the context of the mobile robot 100. It should be understood, however, that various examples of the method 350 can be implemented in accordance with other mobile robots. Furthermore, suitable aspects of the method 350 can be implemented at least partially via the computer system introduced above in the context of the method 200. When aspects of the method 350 are described herein as performed by the mobile robot 100, it should be understood that these descriptions include performing such aspects entirely or partially by the computer system. As with the method 200, the method 350 can occur while the mobile robot 100 is in an environment that also includes a human.

With reference to FIGS. 1-4 together, the method 350 can include receiving a stop command at the mobile robot 100 (block 352a). As discussed above, the stop command can originate at the mobile robot 100 or at a source remote from the mobile robot 100. After receiving the stop command, the method 350 can include decelerating the mobile robot 100 (block 352b), determining hazard information (block 352c), determining clearance information (block 352d), reconfiguring the mobile robot 100 (block 352e), and causing a safe operating stop of the mobile robot 100 (block 352f). These operations can include any suitable features of the corresponding operations discussed above in the context of the method 200. Furthermore, the method 350 can include selecting the reconfiguration among a plurality of candidate reconfigurations, as discussed above in the context of the method 200. In an example, the stop command carries a time limit. The mobile robot 100 compares this time limit to a known implementation time for a candidate reconfiguration. If the implementation time for the candidate reconfiguration is less than the time limit, the mobile robot 100 proceeds with implementing the candidate reconfiguration. If not, the mobile robot 100 attempts the comparison again for a different candidate reconfiguration.

Figures 5G, 5H, 5I, 5J, 5K, 5L, 5M, 5N, 5O:
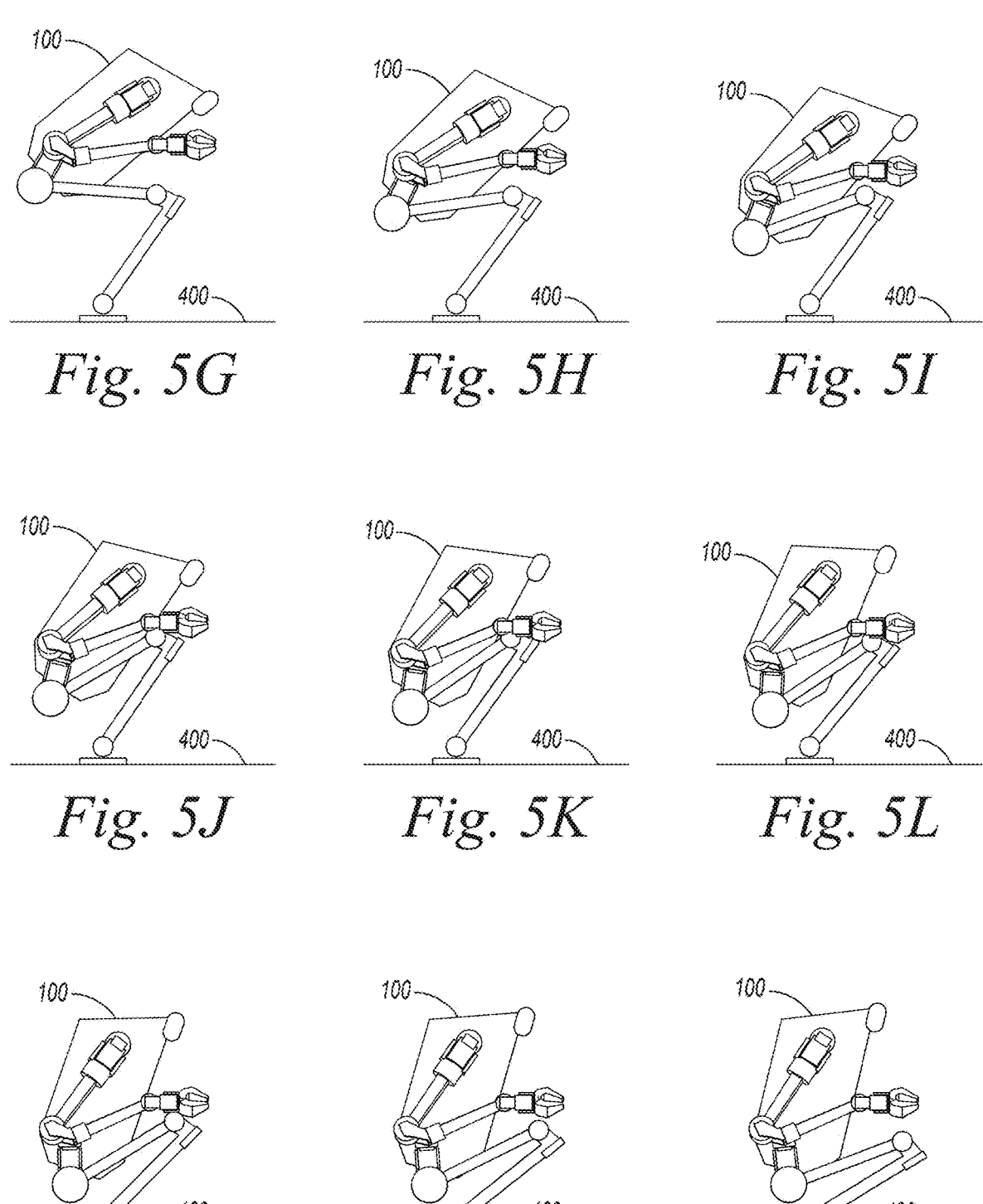
FIGS. 5A-5AD are profile views of the mobile robot of FIG. 1 at different respective times during an example of a method in accordance with at least some embodiments of the present technology.

FIGS. 5A-5AD are profile views of the mobile 100 at different respective times during an example of a reconfiguring the mobile robot 100 during a method in accordance with at least some embodiments of the present technology. The corresponding method can be any of the method 200, the method 350, or another method in accordance with at least some embodiments of the present technology. As discussed above, many different approaches to reconfiguring the mobile robot 100 are possible, of which the reconfiguration shown in FIGS. 5A-5AD is merely one example. With reference now to FIGS. 1 and 5A-5AD together, the overall reconfiguration can lower the center-of-gravity of the mobile robot 100 toward a ground surface 400 in several phases. During a first phase (FIGS. 5A-5G), the reconfiguration can include bending hip and knee joints of the mobile robot 100 to lower an inferior portion of the torso 104 toward the ground surface 400 and to tilt the torso 104 anteriorly. During this phase, portions of the legs 112a, 112b distal to the knee joints can remain relatively stationary. During a second phase (FIGS. 5H-5L), the reconfiguration can include further bending of the hip and knee joints to further lower the inferior portion of the torso 104 toward the ground surface 400. During this phase, portions of the legs 112a, 112b distal to the knee joints can again remain relatively stationary. The mobile robot 100 can hold the torso 104 at an anterior-to-superior position that causes a line of action intersecting a center-of-pressure of the mobile robot 100 between the feet 116a, 116b to remain about centered along lengths of the legs 112a, 112b between the corresponding knee and hip joints. This can be useful to facilitate relatively even distribution of loads on actuators operably associated with the knee and hip joints, thereby increasing the energy efficiency and operating life of the actuators.

Figure 6:
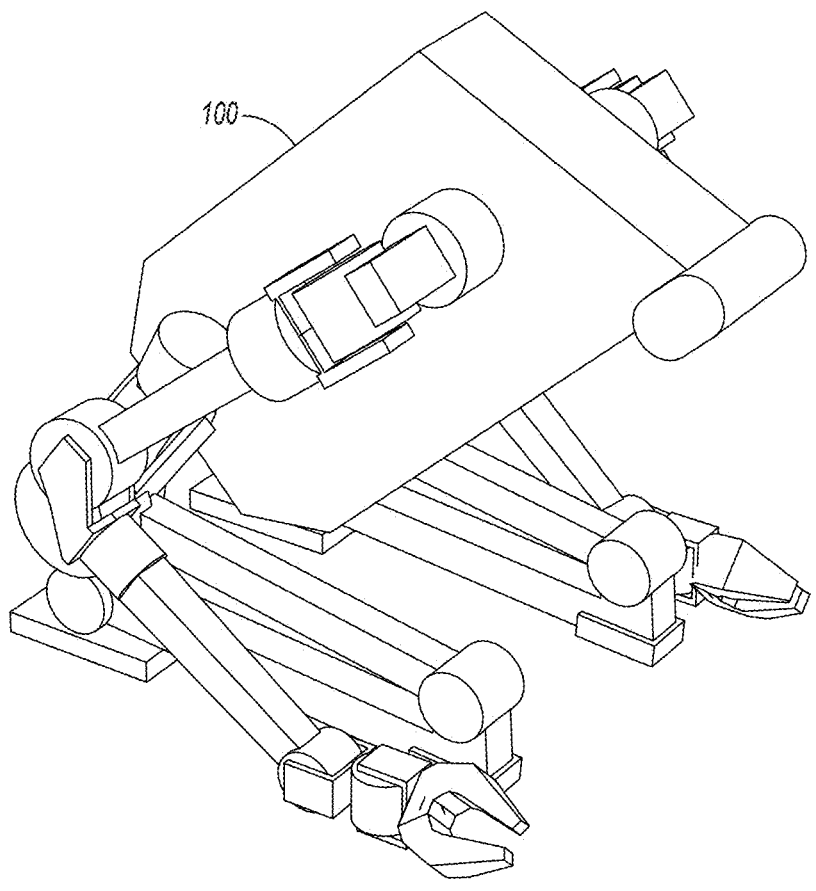
FIGS. 6 is a perspective view of the mobile robot of FIG. 1 at a time during an example of a method in accordance with at least some embodiments of the present technology.

During a third phase (FIGS. 5M-5W), the reconfiguration can include moving the knee joints toward the ground surface 400 while the torso 104 remains relatively stationary. Finally, during a fourth phase (FIGS. 5X-5AD), the reconfiguration can include further tilting the torso 104 anteriorly and moving the end effectors 114a, 114b into contact with the ground surface 400. As shown in FIG. 6, after the reconfiguration, the mobile robot 100 can be in a relatively compact kneeling state with the knee joints and the end effectors 114a, 114b in contact with the ground surface 400 and with the knee joints approximately in-line with and between the end effectors 114a, 114b in a lateral dimension. In the event of a safe torque off event occurring while the mobile robot 100 is in the post-reconfigurations state shown in FIG. 6, the mobile robot 100 may tend to collapse in a predictable manner and into a compact form, thereby reducing or eliminating a safety hazard to nearby humans. Furthermore, in a post-reconfiguration state and/or in a safe operating stop, one or more joints of the mobile robot 100 can be locked. This can further reduce potential movement of the mobile robot 100 in a safe torque off event. In an example, the mobile robot 100 includes a lock (not shown) at a joint between the leg 112a and the torso 104. Similarly, the mobile robot 100 includes a lock (also not shown) at a joint between the leg 112b and the torso 104. These locks individually may include a linear actuator and a pin. When the lock is engaged, the linear actuator may extend the pin across a rotary interface of the corresponding joint such that the pin obstructs rotation at the joint. When the lock is disengaged, the linear actuator may retract the pin such that the joint may again operate normally. In a safe torque off event, the pin may tend to remain in its position before the safe torque off event.

The reconfiguration of FIGS. 5A-5AD is shown occurring while the mobile robot 100 is not carrying a payload. In other cases, a reconfiguration of the mobile robot 100 can occur while the mobile robot 100 is carrying a payload. For example, when the mobile robot 100 holds an object (e.g., a tote, a box, etc.) bimanually and anterior to the torso 104, the mobile robot 100 may implement a reconfiguration that includes extending the arms 110a, 110b and tilting the torso 104 anteriorly before significant movement of the legs 112a, 112b. In at least some cases, as the mobile robot 100 moves the object into contact with the ground surface 400, the end effectors 114a, 114b break contact with the tote. The end effectors 114a, 114b then move into contact with the ground surface in a continuous or near continuous motion. This can occur before or while the mobile robot 100 lowers an inferior portion of the torso 104 toward the ground surface. This and similar reconfigurations can be useful to protect contents of the tote, to reduce a combined footprint of the mobile robot 100 and the tote after the reconfiguration, to reduce or prevent tipping of the tote during the reconfiguration, and/or for one or more other reasons.

Examples of Electrical, Computer, and Software Systems

Figure 7:
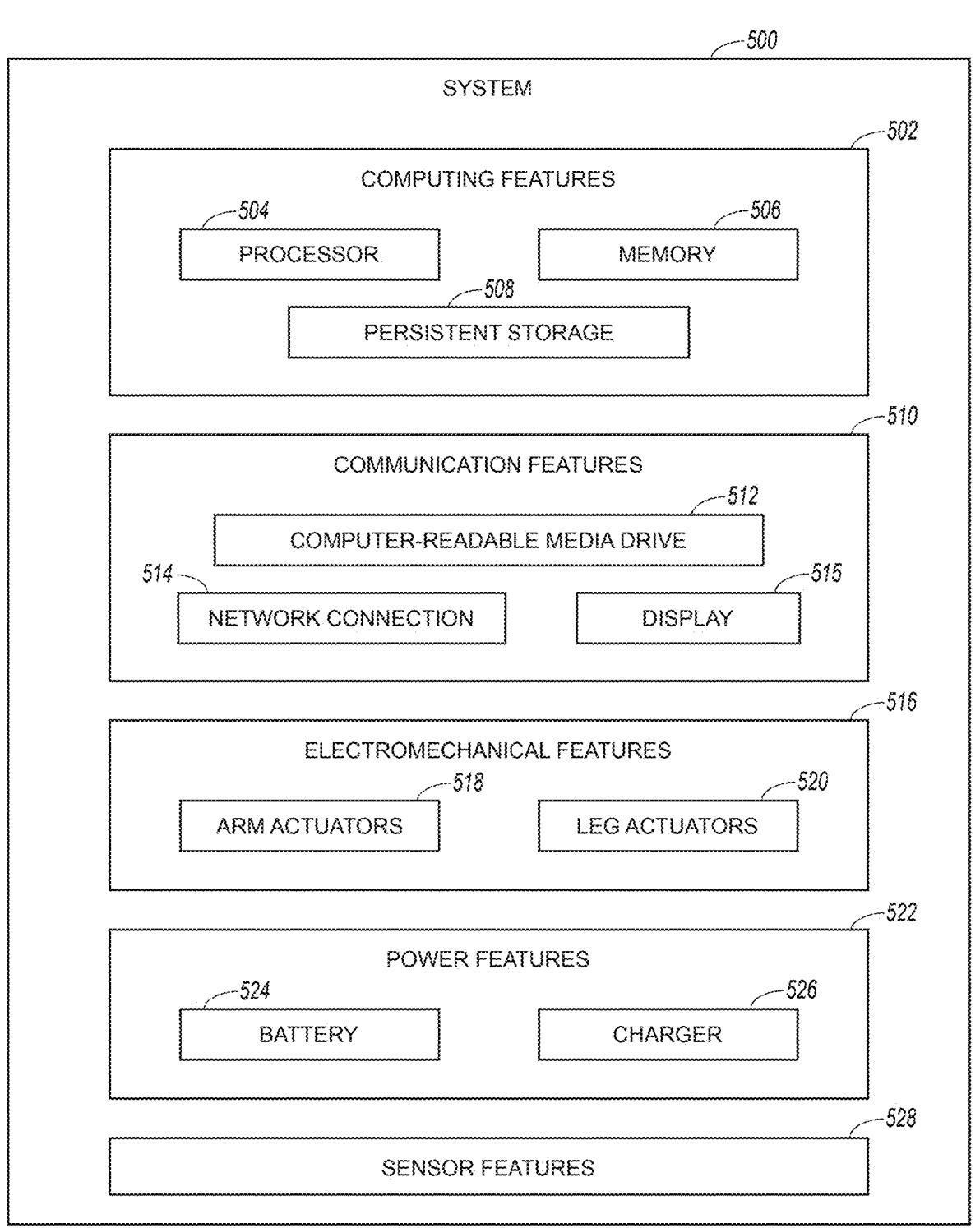
FIG. 7 is a block diagram depicting a system including electrical, computer, and software components operably associated with a mobile robot relevant to methods in accordance with at least some embodiments of the present technology.

FIG. 7 is a block diagram depicting a system 500 including electrical, computer, and software features operably associated with a mobile robot in accordance with at least some embodiments of the present technology. The system 500 may be described in the context of the mobile robot 100 (FIG. 1) as an example. When suitable, operations described elsewhere in this disclosure can be implemented at least partially via the devices and systems disclosed in this section. For example, the computer system discussed above in the connection with the methods 200, 350 can be part of the system 500. As shown in FIG. 7, the system 500 can include computing features 502. The computing features 502 can include a processor 504, such as one or more general-purpose or special-purpose integrated circuits including digital logic gates for executing programs or for otherwise processing data. The computing features 502 can further include memory 506, such as one or more integrated circuits for storing data in use. The memory 506 can include a multithreaded program, an operating system including a kernel, device drivers, etc. The computing features 502 can further include persistent storage 508, such as a hard drive for persistently storing data. Examples of data that can be stored by the persistent storage 508 include diagnostic data, sensor data, configuration data, environmental data, and current-state data. The computing features 502 can collectively define a computer configured to manage, control, receive information from, deliver information to, and/or otherwise usefully interact with other features of the system 500.

The system 500 can further include communication features 510. The communication features 510 can include a computer-readable media drive 512 for reading computer programs and/or other data stored on computer-readable media. As one example, the computer-readable media drive 512 can be a flash-memory drive. The communication features 510 can further include a network connection 514 for connecting the mobile robot 100 to other devices and systems, such as other mobile robots and/or other computer systems. The network connection 514 can be wired or wireless and can be via the Internet, a Local Area Network (LAN), a Wide Area Network (WAN), BLUETOOTH®, Wi-Fi®, a cellular-phone network, etc. The network connection 514 can include networking hardware, such as routers, switches, transmitters, receivers, computer-readable transmission media, etc. The communication features 510 can further include a display 515 (e.g., a touchscreen) and/or other suitable features for communicating with a user. The mobile robot 100 can use the communication features 510 for internal and/or external operations. Examples of these operations include interacting with systems that provide contextual information about the environment in which the mobile robot 100 operates and interacting with systems for changing operating conditions of the mobile robot 100.

The system 500 can further include electromechanical features 516. The electromechanical features 516 can include arm actuators 518 and leg actuators 520 operably associated with respective joints of the arms 110a, 110b and the legs 112a, 112b. In addition or alternatively, the electromechanical features 516 can include other suitable features for implementing mechanical action within the mobile robot 100. As shown in FIG. 7, the system 500 can further include power features 522, such as a battery 524 and a charger 526. The battery 524 can be a lithium-ion battery, a sodium-ion battery, or a battery of another suitable type. The charger 526 can include a connector (not shown) compatible with a power source (e.g., a wall outlet, a charging station, etc.) and leads extending between the connector and the battery 524. In at least some cases, the mobile robot 100 is configured to operate wirelessly via the battery 524 and to recharge via the charger 526.

Finally, the system 500 can include sensor features 528 for capturing, providing, and/or analyzing information about the mobile robot 100 itself and/or the environment in which the mobile robot 100 operates. The sensor features 528 can include a vision sensor (e.g., a camera), a light sensor (e.g., a photoresistor), a sound sensor (e.g., a microphone), a location sensor (e.g., a Global Positioning System (GPS) sensor), a two-dimensional sensor, a three-dimensional sensor, and/or a proximity sensor, among other examples. Within the body 102 and/or at one or more other suitable locations, the mobile robot 100 can include among the sensor features 528, an accelerometer, a gyroscope, a magnetometer, and/or a tilt sensor, among other examples. At the end effectors 114a, 114b, at the feet 116a, 116b, and/or at one or more other suitable locations, the mobile robot 100 can include among the sensor features 528, a contact sensor and/or a force sensor. In at least some cases, two or more different types of sensors are incorporated into a sensor assembly of the mobile robot 100. For example, an accelerometer, a gyroscope, and a magnetometer or another suitable combination of sensors can be incorporated into an inertial measurement unit (IMU) through which the mobile robot 100 can determine parameters such as acceleration, angular velocity, and orientation. The mobile robot 100 can include an IMU within the torso 104, within the head 106, and/or at one or more other suitable locations.

At one, some, or all of the arm actuators 518, at one, some, or all of the leg actuators 520, and/or at one or more other suitable locations, the mobile robot 100 can include among the sensor features 528, sensors that measure properties of corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the mobile robot 100 may sense a torque acting on a given joint via a torque sensor operably associated with the joint, such as a torque sensor that outputs torque as function of current. As another example of direct sensing, the mobile robot 100 may sense a position of a given joint via an encoder operably associated with the joint. Any joint described herein should be construed as potentially including a torque sensor, encoder, and/or other suitable mechanism for direct sensing. As an example of indirect sensing, the mobile robot 100 may sense a position of a given one of the end effectors 114a, 114b or other feature based on perception data corresponding to the feature and other data corresponding to a reference. The mobile robot 100 can include one or more sensors in a sensor system, such as a vision system, a LiDAR system, a stereoscopic camera system, a SONAR system, etc. In at least some cases, the mobile robot 100 monitors itself and/or its environment in real-time or in near real-time. Moreover, the mobile robot 100 may use acquired sensor data as a basis for decision-making via the computing features 502.

Features of the system 500 can be connected to one another and/or to other features of the mobile robot 100 via suitable conductors, transmitters, receivers, circuitry, etc. While the system 500 configured as described may be used to support operation of the mobile robot 100, it should be appreciated that the mobile robot 100 may be operated using devices of various types and configurations and that such devices may have various components and levels of responsibility. For example, the mobile robot 100 may employ individual computer systems and/or controllers to manage discrete aspects of its operations, such as an individual computer system or controller to perform computer vision operations, a separate computer system or controller to perform power management, etc. In some cases, the mobile robot 100 employs the system 500 to control physical aspects according to one or more designated rules encoded in software. For example, these rules can include minimums and/or maximums, such as a maximum degree of rotation for a joint, a maximum speed at which a link is allowed to move, a maximum acceleration rate for the feet 116a, 116b, etc. The mobile robot 100 may include any number of mechanical aspects and associated rules, which may be based on or otherwise configured in accordance with the purpose of and/or functions performed by the mobile robot 100.

Software features of the system 500 and other computer systems described herein may take the form of computer-executable instructions, such as program modules executable by the computing features 502. Generally, program modules include routines, programs, objects, data structures, or the like configured to perform particular tasks based on source data, which may be encrypted. Control scripts may be implemented via a suitable language, such as C/C++ or Python®. The functionality of the program modules may be combined or distributed in various embodiments, including in cloud-based implementations. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, a WAN, or the Internet. In a distributed computing environment, program modules and other features may be located in both local and remote memory storage and in other devices, which may be in communication via one or more wired or wireless communication channels.

Aspects of the present technology may be stored or distributed on tangible computer-readable media, which can include volatile or non-volatile storage features, such as magnetically or optically readable computer media, hard-wired or preprogrammed chips (e.g., electrically erasable programmable read-only memory semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks) on a propagated signal on a propagation medium (e.g., electromagnetic wave(s), sound wave(s), etc.) over a period of time. Furthermore, such data may be provided on an analog or digital network and packet switched, circuit switched, or managed under another suitable scheme. The term computer-readable storage medium as used herein does not, however, encompass signals themselves (e.g., propagating signals) or transitory media. One of ordinary skill in the art will recognize that various features of the mobile robot 100 and other devices and systems described herein may communicate via any number of wired or wireless communication techniques and that elements of such devices and systems may be distributed rather than located in a single monolithic entity. Finally, electrical and computing aspects of systems in accordance with various embodiments of the present technology may operate in environments or according to processes other than the examples of environments and processes described herein.

Figure 8:
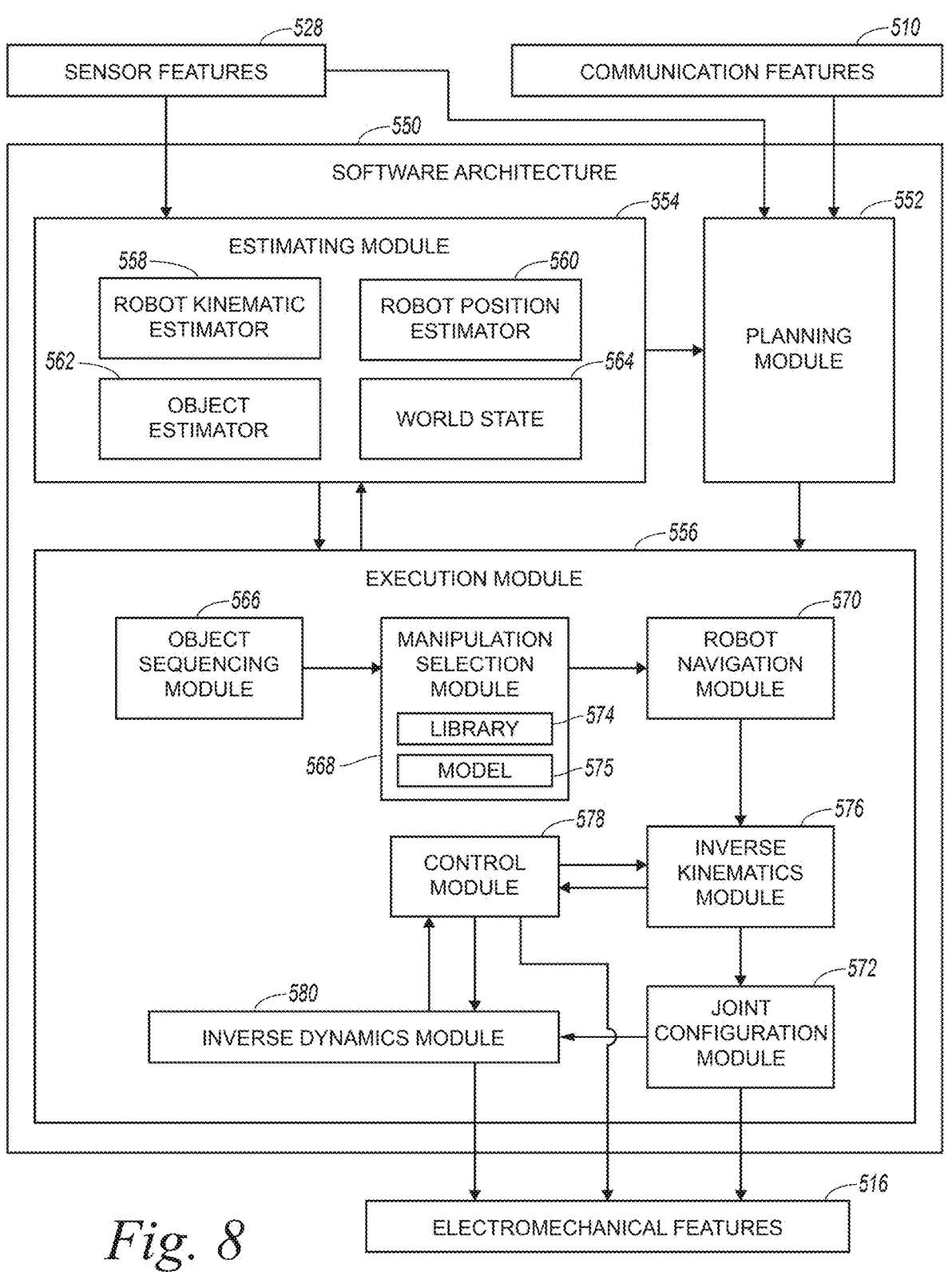
FIG. 8 is a block diagram depicting software architecture and associated portions of the system of FIG. 7.

FIG. 8 is a block diagram depicting software architecture 550 and associated portions of the system 500. The software architecture 550 can be within the memory 506 or otherwise operably associated with any or all of the various features of the system 500 as described above. With reference to FIGS. 7 and 8 together, the software architecture 550 can include a planning module 552, an estimating module 554, and an execution module 556 operably associated with one other. The planning module 552 can be configured to relay or to generate a plan corresponding to an objective for the mobile robot 100 (e.g., unload all objects on a shelf, retrieve an object from a first location and move the object to a second location, etc.). In at least some cases, the planning module 552 receives information from the communication features 510 of the system 500 and relays or generates a plan based at least partially on the received information. For example, the planning module 552 may receive a task request from a user via the communication features 510 and relay the task request as a plan. As another example, the planning module 552 may receive a task request from a user via the communication features 510 and generate a plan related to the task request. As yet another example, the planning module 552 may generate a plan without receiving a task request from a user, such as at a predetermined time and/or in response to information about a current state of the mobile robot 100 or the environment received via the sensor features 528 of the system 500. Software components of the computer system discussed above in connection with the methods 200, 350 can be implemented in the software architecture 550 via the planning module 552.

The estimating module 554 can receive information from the sensor features 528 and generate estimates in real time or in near real time to inform generating and/or executing a plan. The estimating module 554 can include a robot kinematic estimator 558, a robot position estimator 560, an object estimator 562, and a world state 564. The robot kinematic estimator 558 can generate an estimate of a current kinematic state of the mobile robot 100 (e.g., balanced, off-balance, walking, standing, etc.) and estimates of positions of individual joints of the mobile robot 100. The robot position estimator 560 can generate a current estimate of a position of the mobile robot 100 within an environment. This position can be a set of coordinates and can be based on perception information, GPS information, and/or other information received by or generated by the mobile robot 100. Perception information potentially relevant to the position of the mobile robot 100 includes, among other examples, information corresponding to distances between the mobile robot 100 and landmarks in an environment and information corresponding to fiducial markings (e.g., AprilTags) carried by or otherwise associated with the landmarks. This information can be detected, for example, via a camera of the mobile robot 100. Furthermore, information can move between components of the estimating module 554. For example, the world state 564 can receive information from the robot kinematic estimator 558, the robot position estimator 560, and the object estimator 562. In addition or alternatively, the object estimator 562 can receive information from the robot kinematic estimator 558 and the robot position estimator 560.

The object estimator 562 can generate a current estimate of an object within an environment. In at least some cases, the estimate is a pose or other reference corresponding to a position and orientation of the object. As with the position of the mobile robot 100 itself, the position of an object can be a set of coordinates and can be based on perception information, GPS information, and/or other information received by or generated by the mobile robot 100. Perception information potentially relevant to the position of an object includes, among other examples, information corresponding to distances between the object and the mobile robot 100, distances between the object and landmarks in an environment, and information corresponding to fiducial markings (e.g., AprilTags) carried by or otherwise associated with the object. This information can be detected, for example, via a camera of the mobile robot 100. In at least some cases, the object estimator 562 uses information (e.g., sensor poses) from the robot kinematic estimator 558 and/or the robot position estimator 560 to inform generation of object estimates. This can be useful, for example, when a fiducial or other landmark in an environment is not visible. The object estimator 562 can be configured to update the world state 564 with object references and/or other information related to objects in an environment in which the mobile robot 100 operates. Furthermore, the object estimate can include an identification of an object and properties (e.g., dimensions) associated with that identification. For example, the object estimator 562 can include an object-recognition model (e.g., Detectron2 (Facebook AI Research) with Mask R-CNN implementation) that receives perception information (e.g., an image) corresponding to an object and outputs an object identification based at least partially on the perception information. The object estimator 562 can further include a lookup table for generating object properties based at least partially on this object identification.

The execution module 556 can be configured to receive a plan from the planning module 552 and estimates from the estimating module 554. The plan can include one or more motion commands and/or motion-command precursors as discussed above in connection with examples of the method 200. The execution module 556 can include an object sequencing module 566, a manipulation selection module 568, a robot navigation module 570, and a joint configuration module 572. The planning module 552 can be configured to send a plan to the object sequencing module 566, to the manipulation selection module 568, to the robot navigation module 570, or to the joint configuration module 572 based on attributes of the plan. For example, when a plan includes explicit instructions for positions of the electromechanical features 516 of the system 500, the planning module 552 can send the plan to the execution module 556 via the joint configuration module 572. As another example, when a plan does not involve manipulating an object, the planning module 552 can send the plan to the execution module 556 via the robot navigation module 570. As yet another example, when a plan concerns only one object and the object is remote to the mobile robot 100, the planning module 552 can send the plan to the execution module 556 via the manipulation selection module 568. As a final example, when a plan concerns multiple objects remote to the mobile robot 100, the planning module 552 can send the plan to the execution module 556 via the object sequencing module 566.

The object sequencing module 566 can receive one or more estimates from the estimating module 554 and can generate a sequence in which multiple objects are to be manipulated. For example, when the object sequencing module 566 receives a plan to unload a shelf, the object sequencing module 566 can query the estimating module 554 for current locations of objects on the shelf. The object sequencing module 566 can then assign the objects an order, convert the order into a queue, and pass the queue to the manipulation selection module 568. The manipulation selection module 568 can include a library 574 including manipulation primitives and/or sequences of manipulation primitives that can be used to manipulate an object. The manipulation selection module 568 can select manipulation primitives and/or sequences for a given object based on contextual information, such as information about the object and/or information about the environment. In addition or alternatively, the manipulation selection module can include a model 575 that outputs manipulation estimates based on contextual information. The robot navigation module 570 can generate targets for different parts of the mobile robot 100 further to a manipulation portion or other portions of a plan being executed. Examples of targets include positions of the feet 116a, 116b in the environment, positions of the end effectors 114a, 114b in the environment, etc. The robot navigation module 570 can update these targets continuously or near continuously based on information from the estimating module 554. The execution module 556 can further include an inverse kinematics module 576 that translates the targets from the robot navigation module 570 into joint configurations throughout the mobile robot 100.

The execution module 556 can also include a control module 578 that receives joint configurations from the inverse kinematics module 576 and generates joint parameters (e.g., positions, velocities, accelerations, etc.) to be executed by the mobile robot 100 via the electromechanical features 516 of the system 500 to achieve these joint configurations. Through continuous or near-continuous communication with the inverse kinematics module 576, the control module 578 can modify the joint parameters to at least partially compensate for deviations as the mobile robot 100 executes the joint configurations. The inverse kinematics module 576 can send other joint configurations not subject to active control to the joint configuration module 572 directly. Similar to the control module 578, the joint configuration module 572 can generate joint parameters (e.g., positions, velocities, accelerations, etc.) to be executed by the mobile robot 100 to achieve joint configurations received from the inverse kinematics module 576 or from the planning module 552.

Finally, the execution module 556 can include an inverse dynamics module 580 that receives joint parameters from the control module 578 and from the joint configuration module 572. The inverse dynamics module 580 can track a desired wrench of the mobile robot 100 and its relationship with objects in the environment. In at least some cases, the inverse dynamics module 580 references a map of robot positions and wrenches to joint torques. Based at least partially on tracking these joint torques, the inverse dynamics module 580 can modify joint parameters to achieve a desired result. For example, the inverse dynamics module 580 may modify joint parameters from the control module 578 and from the joint configuration module 572 to maintain contact between the end effectors 114a, 114b and an object as the mobile robot 100 carries the object. The inverse dynamics module 580 can then send modified joint parameters to the electromechanical features 516 of the system 500 for execution. For configurations that do not involve dynamic interaction with the environment, the control module 578 and the joint configuration module 572 can send joint parameters directly to the electromechanical features 516 for execution.

With reference to FIGS. 7 and 8 together, suitable software components disclosed herein can be part of a distributed system or component thereof or implemented as one or more network-based services. For example, a compute cluster within a computing service may present computing or storage services or other types of services that employ any distributed computing systems described herein to clients as network-based services. In some embodiments, a network-based service may be implemented by a software or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke. Relatedly, the network-based service may define a particular API to which other systems may be expected to conform when requesting the various operations. In the cloud provider network context, APIs may provide a gateway for customers to access cloud infrastructure by allowing customers to obtain data from and/or to cause actions within the cloud provider network, enabling the development of applications that interact with resources and services hosted in the cloud provider network. APIs can also enable different services of the cloud provider network to exchange data with one another.

In a distributed system, some or all of the software architecture 550 and other software described herein can be executed remotely from the mobile robot 100. For example, the mobile robot 100 can be configured to collect raw sensor data via the sensor features 528 of the system 500 and to transmit some or all of this raw sensor data to a remote server in real time or near real time for processing. The mobile robot 100 can then receive joint commands and/or other products of this processing via communication with the server. In these and other cases, computing operations can be allocated among local and remote computing systems depending on factors such as computing demand, available computing resources, time sensitivity of computing products, etc. Moreover, even the sensor features 528 can be remote from the mobile robot 100 in certain cases. For example, a remote sensor may track its reference frame relative to a local sensor of the mobile robot 100 and may communicate that reference frame with sensor data it collects at any given time. A server receiving the sensor data can then use the relationship between the reference frame of the local sensor and the reference frame of the remote sensor to generate output in a reference frame compatible with processes that rely on sensor data from the local sensor only. Alternatively, in a non-distributed system, all information processing and command execution can occur locally at the mobile robot 100 or other local hardware depending on the implementation.

Conclusion

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms. References herein to any of receiving, determining, generating, and selecting information in accordance with various embodiments of the present technology encompass, when feasible, the others of receiving, determining, generating, and selecting the information and indicate that such operations can occur at least partially via the relevant computing subsystem.

Directional terms, such as "upper," "lower," "front," "back," "vertical," and "horizontal," may be used herein to express and clarify the relationship between various structures. It should be understood that such terms do not denote absolute orientation. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

24

We claim:

1. A method comprising:
   determining, by a computer system operably associated with a mobile robot in an environment, first hazard information about a human in the environment at a first time, wherein the first hazard information indicates a first level of risk of collision between the mobile robot and the human;
   decelerating the mobile robot based at least partially on the first hazard information;
   determining, by the computer system, second hazard information about the human at a second time after the first time, wherein the second hazard information indicates a second level of risk of collision between the mobile robot and the human, and wherein the second level of risk is greater than the first level of risk;
   determining, by the computer system, clearance information about a portion of the environment around the mobile robot after decelerating the mobile robot; and
   reconfiguring the mobile robot based at least partially on the second hazard information and the clearance information, wherein reconfiguring the mobile robot includes lowering a center-of-gravity of the mobile robot.

2. The method of claim 1, wherein:
   the method further comprises determining, by the computer system, third hazard information about the human at a third time after the second time; and
   causing a safe operating stop of the mobile robot based at least partially on the third hazard information.

3. The method of claim 1, wherein:
   determining the second hazard information includes determining a proximity of the human to the mobile robot at the second time; and
   reconfiguring the mobile robot includes reconfiguring the mobile robot based at least partially on the proximity of the human to the mobile robot at the second time.

4. The method of claim 1, wherein:
   the first hazard information indicates compliance, by the human, with a safety protocol at the first time; and
   the second hazard information indicates non-compliance, by the human, with the safety protocol at the second time.

5. The method of claim 1, wherein:
   determining the second hazard information includes determining a trajectory of the human at the second time; and
   reconfiguring the mobile robot includes reconfiguring the mobile robot based at least partially on the trajectory of the human at the second time.

6. The method of claim 1, wherein:
   determining the second hazard information includes determining a speed of the human at the second time; and
   reconfiguring the mobile robot includes reconfiguring the mobile robot based at least partially on the speed of the human at the second time.

7. The method of claim 1, wherein determining the second hazard information includes:
   gathering, via the computer system, sensor data on the environment at the second time;
   providing, via the computer system, the sensor data to a machine-learning model; and
   receiving, via the computer system, the second hazard information as an output from the machine-learning model.

8. The method of claim 7, wherein:

receiving the second hazard information includes receiving a state of the human at the second time as the output from the machine-learning model; and reconfiguring the mobile robot includes reconfiguring the mobile robot based at least partially on the state of the human at the second time.

9. The method of claim 1, wherein decelerating the mobile robot includes moving a foot of the mobile robot into contact with a ground surface while another foot of the mobile robot is in contact with the ground surface.

10. The method of claim 1, wherein reconfiguring the mobile robot includes bending a knee joint of the mobile robot.

11. The method of claim 1, wherein reconfiguring the mobile robot includes tilting a torso of the mobile robot anteriorly.

12. The method of claim 1, wherein reconfiguring the mobile robot includes crouching the mobile robot.

13. The method of claim 1, wherein reconfiguring the mobile robot includes reducing a fault-state fall extent of the mobile robot by at least 50%.

14. The method of claim 1, wherein reconfiguring the mobile robot includes kneeling the mobile robot.

15. The method of claim 1, wherein determining the first hazard information, decelerating the mobile robot, and determining the second hazard information occur while the mobile robot is dynamically stable.

16. The method of claim 1, wherein decelerating the mobile robot includes moving the mobile robot from an ambulating state to a standing state.

17. The method of claim 1, wherein:

the method further comprises selecting, by the computer system, a reconfiguration type among a plurality of candidate reconfiguration types based at least partially on the second hazard information; and reconfiguring the mobile robot includes reconfiguring the mobile robot in accordance with the selected reconfiguration type.

18. The method of claim 1, wherein:

the method further comprises selecting, by the computer system, a reconfiguration type among a plurality of candidate reconfiguration types based at least partially on the clearance information; and reconfiguring the mobile robot includes reconfiguring the mobile robot in accordance with the selected reconfiguration type.

19. The method of claim 1, wherein reconfiguring the mobile robot includes moving the mobile robot from a standing configuration to a non-standing configuration.

20. The method of claim 1, wherein reconfiguring the mobile robot includes extending arms of the mobile robot to place a payload carried by the mobile robot into contact with a ground surface.

* * * * *